_(12)_ United States Patent
Hayakawa

(10) Patent No.: US 9,253,341 B2
(45) Date of Patent: Feb. 2, 2016

(54) EXECUTION INSTRUCTING APPARATUS, EXECUTION INSTRUCTING METHOD, AND STORAGE MEDIUM

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/567,978

(22) Filed: Dec. 11, 2014

(65) Prior Publication Data

US 2015/0181054 A1    Jun. 25, 2015

(30) Foreign Application Priority Data

Dec. 19, 2013  (JP) ................................ 2013-262769

(51) Int. Cl.
*G06F 3/12* (2006.01)
*H04N 1/00* (2006.01)

(52) U.S. Cl.
CPC .......... *H04N 1/00244* (2013.01); *G06F 3/1203* (2013.01); *G06F 3/1236* (2013.01); *G06F 3/1285* (2013.01); *H04N 1/00912* (2013.01); *H04N 2201/0039* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS

| 7,454,482 | B2 * | 11/2008 | Barnard | H04L 41/0253 |
| | | | | 358/1.13 |
| 7,577,155 | B2 * | 8/2009 | Yamamoto | G06K 15/00 |
| | | | | 358/1.15 |
| 8,745,401 | B1 * | 6/2014 | Hintz et al. | 713/176 |
| 8,767,226 | B2 * | 7/2014 | Sakura | G06F 3/1204 |
| | | | | 358/1.13 |
| 2001/0021037 | A1 * | 9/2001 | Itoh | 358/1.15 |
| 2007/0030516 | A1 * | 2/2007 | Tsuji | G06F 3/1204 |
| | | | | 358/1.15 |
| 2007/0156705 | A1 * | 7/2007 | Tsuya | 707/10 |
| 2008/0291483 | A1 * | 11/2008 | Shimatani | 358/1.15 |
| 2009/0150493 | A1 * | 6/2009 | Tonegawa | 709/206 |
| 2012/0026535 | A1 * | 2/2012 | Rovner et al. | 358/1.15 |
| 2013/0215469 | A1 * | 8/2013 | Pizot et al. | 358/1.15 |
| 2014/0082173 | A1 * | 3/2014 | Kaneko | 709/223 |

FOREIGN PATENT DOCUMENTS

JP    2007-174444 A    7/2007

* cited by examiner

*Primary Examiner* — Dung Tran
(74) *Attorney, Agent, or Firm* — Canon USA, Inc. IP Division

(57) ABSTRACT

An execution instructing apparatus that operates to communicate with at least one processing apparatus executing a predetermined processing includes: a determination unit determining whether, of a first communication method where the execution instructing apparatus communicates with an image processing apparatus via a server which is neither the image processing apparatus nor the execution instructing apparatus, and a second communication method where the execution instructing apparatus communicates with the image processing apparatus without the server, communication can be performed using the second communication method; and a communication control unit controlling communication with the image processing apparatus so that when a determination is not made or when communication cannot be performed using the second communication method, communication regarding the predetermined processing is performed using the first communication method, and when communication can be performed using the second communication method, communication regarding the predetermined processing is performed using the second communication method.

20 Claims, 19 Drawing Sheets

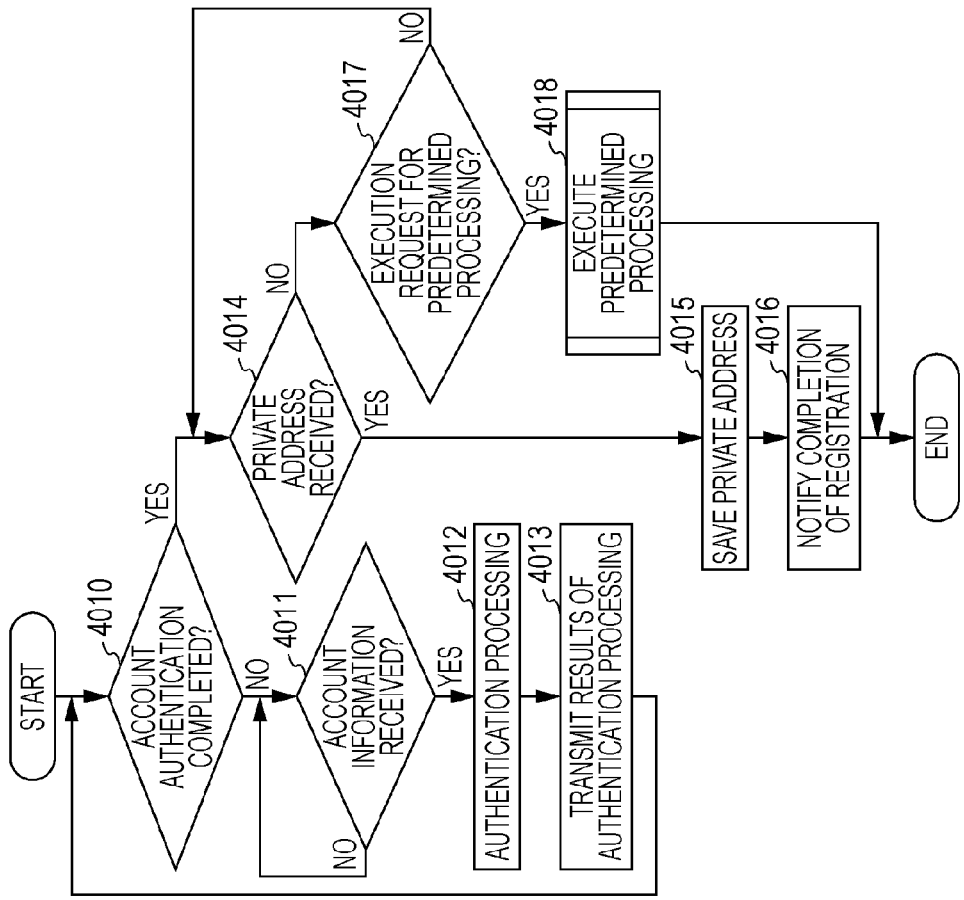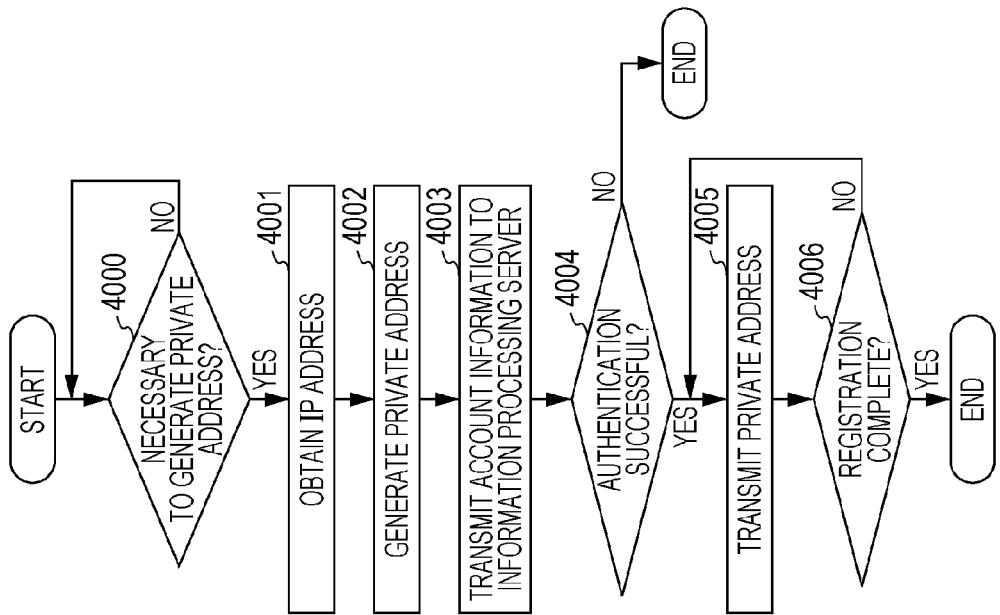

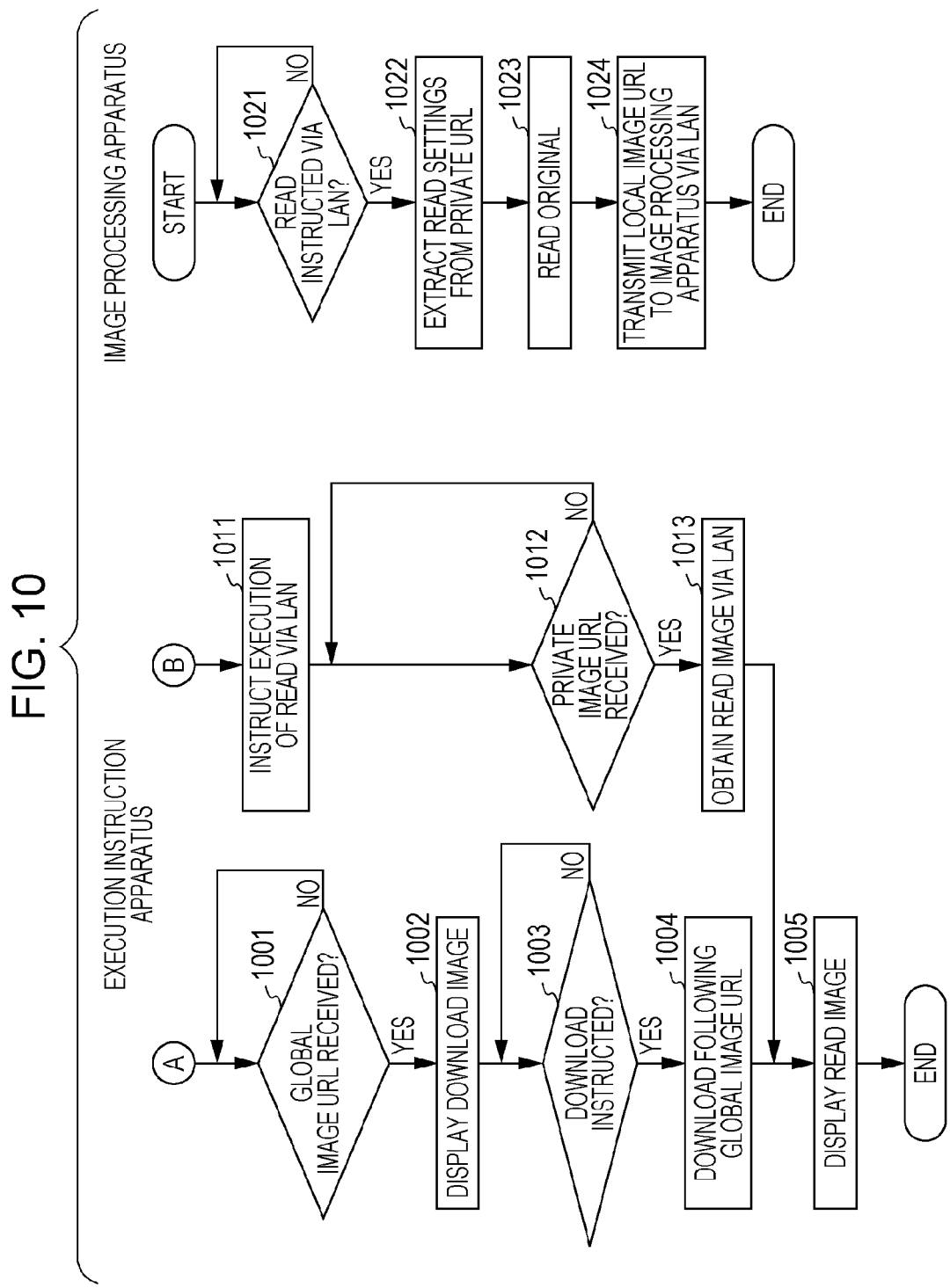

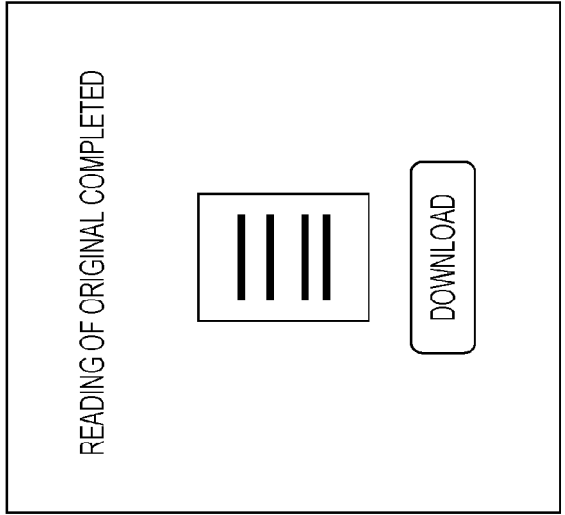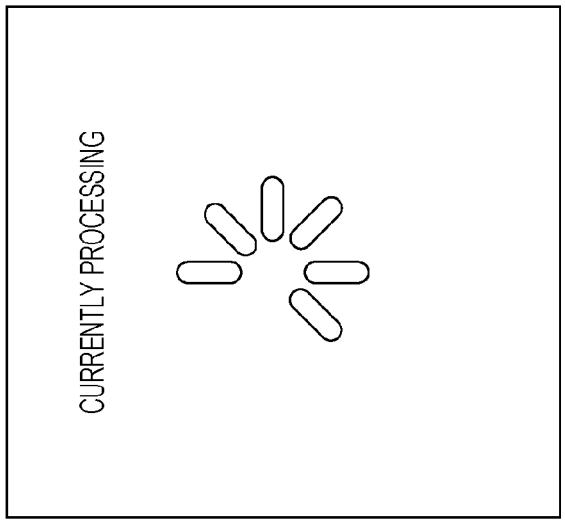

FIG. 15

MODEL: ABC Model-x

INSTALLED AT ABC OFFICE 1F

TYPE OF ORIGINAL: DOCUMENT
SIZE OF ORIGINAL: A4
RESOLUTION: 300 dpi
IMAGE FORMAT: JPEG

READ IMAGE

FIG. 16

MODEL: ABC Model-x
PRINT QUALITY: STANDARD
SHEET SIZE: A4
MEDIA: PLAIN PAPER
FILE TO PRINT: Sample.jpg

SELECT

START PRINTING

EXECUTION INSTRUCTING APPARATUS, EXECUTION INSTRUCTING METHOD, AND STORAGE MEDIUM

BACKGROUND OF THE INVENTION

1. Field of the Invention

The present invention relates to an execution instructing apparatus which instructs a processing apparatus to execute predetermined processing, an execution instructing method, and a storage medium.

2. Description of the Related Art

There are known systems where apparatuses such as personal computers (PCs), cellular phones, and so forth, cause a processing apparatus such as a scanner or the like to execute processing, utilizing various types of interfaces such as Universal Serial Bus (USB), wireless local area network (LAN), and so forth.

Japan Patent Laid-Open No. 2007-174444 describes a system in which a PC and a scanner are connected through a server. This system is described as the PC giving the server a scan instruction to go to the scanner, upon reception of that instruction the server causes the scanner to read an original, and the scan results are transmitted to the server.

However, in cases where a PC gives a scan instruction through a server as in the conventional art described above, processing may be performed through the server even if the scan actually could be executed without going through the server.

SUMMARY OF THE INVENTION

An execution instructing apparatus causes at least one processing apparatus to execute a predetermined processing. The execution instructing apparatus includes a communication unit capable of executing a first communication method where the execution instructing apparatus communicates with an image processing apparatus via a server which is neither the image processing apparatus nor the execution instructing apparatus, and a second communication method where the execution instructing apparatus communicates with the image processing apparatus without going through the server. The execution instructing apparatus also includes a determination unit configured to determine whether communication can be performed by executing access to the at least one processing apparatus and/or the image processing apparatus in accordance with the second communication method, in a case where a user has instructed execution of the predetermined processing by the at least one processing apparatus. The execution instructing apparatus further includes a communication control unit configured to cause the at least one processing apparatus to perform the predetermined processing in accordance with the first communication method in a case where a determination is not made by the determination unit that communication can be performed in accordance with the second communication method and/or in a case where a determination is made by the determination unit that communication cannot be performed in accordance with the second communication method, and to cause the at least one processing apparatus to perform the predetermined processing in accordance with the second communication method in a case where a determination is made that communication can be performed in accordance with the second communication method, even if communication can be performed by the first communication method.

Further features of the present invention will become apparent from the following description of exemplary embodiments with reference to the attached drawings.

BRIEF DESCRIPTION OF THE DRAWINGS

FIGS. 4A and 4B are flowcharts illustrating processing of registering a private address, for access to the image processing apparatus, in the information processing server.

FIG. 10 is a flowchart of processing in which the execution instructing apparatus acquires a read image via a LAN or the information processing server.

FIGS. 11A through 11C are diagrams illustrating display screens displayed at the execution instructing apparatus.

FIG. 15 illustrates an example of a settings screen illustrating ID information of an image processing apparatus.

FIG. 16 is a diagram illustrating an example of a print settings screen displayed at the execution instructing apparatus.

DESCRIPTION OF THE EMBODIMENTS

Figure 1:
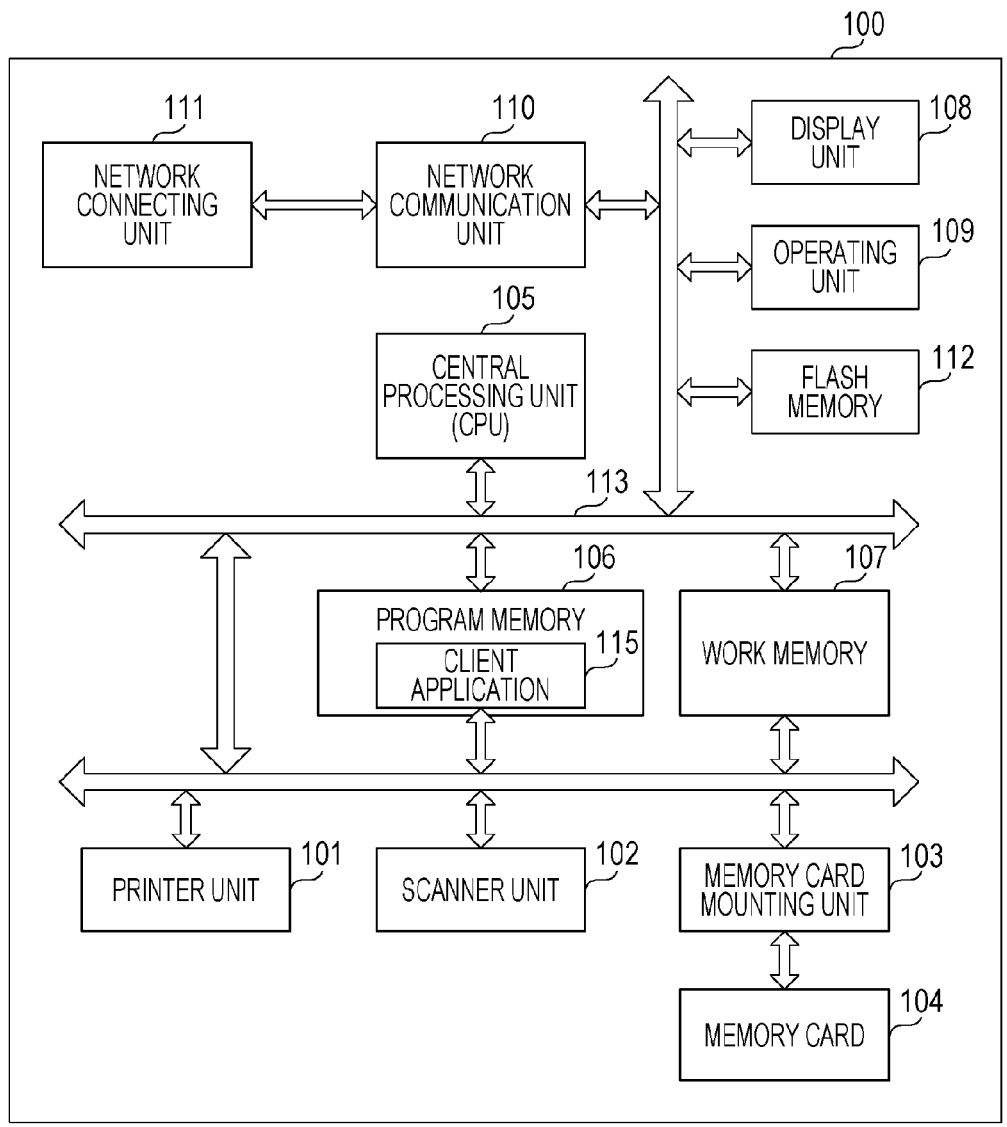
FIG. 1 is a block diagram illustrating the configuration of an image processing apparatus according to an embodiment.

An embodiment will be exemplarily described with reference to the attached drawings. FIG. 1 is a block diagram illustrating the configuration of an image processing apparatus according to the embodiment. An image processing apparatus 100 includes printer functions, scanner functions, and storage functions, and can provide each of the function services over a network.

The printer functions of the image processing apparatus 100 are realized by a printer unit 101, the scanner function by a scanner unit 102, and the storage functions by a memory card mounting unit 103 and memory card 104. The printer unit 101 prints print data which the image processing apparatus 100 has received externally, image data stored in the memory card 104, and so forth, on print media such as print sheets, under control of a central processing unit (CPU) 105 which will be described later. Various systems may be used as the print system, including the ink jet system, electrophotographic system, and so forth. The scanner unit 102 reads an original set on a document plate using an optical sensor, and converts into digital data, under control of the CPU 105. The digitized image data after conversion is further converted into a file of a format specified beforehand, under control of the CPU 105. The CPU 105 further transmits the converted file to an external apparatus over a network, or stores the file in the memory card 104 or later-described flash memory 112.

The CPU 105 controls various components of the image processing apparatus 100. Program memory 106 is nonvolatile memory such as read-only memory (ROM) and the like, storing program code which the CPU 105 reads out. The image processing apparatus 100 further includes work memory 107 such as random access memory (RAM) which temporarily store or buffers image data and the like when executing the various services.

In the configuration such as described above, the CPU 105 loads programs stored in the program memory 106 to the work memory 107, and executes the programs, whereby the components of the image processing apparatus 100 can be controlled. Note that the image processing apparatus 100 is not restricted to having one processor; the image processing apparatus 100 may be controlled by multiple processors working collaboratively. Further, the image processing apparatus 100 may include hardware such as circuits or the like which realize part or all of the processing of the present embodiment described below.

The CPU 105 in such a configuration can perform print control processing to print images based on data received by a network connecting unit, and images based on data stored in the memory card 104 and flash memory 112, at the printer unit 101. The CPU 105 can also control the scanner unit 102 to perform read control processing so that the scanner unit 102 reads originals and acquires read images.

A display unit 108 is a display device such as a liquid crystal display (LCD) or the like. An operating unit 109 is an operating device which includes various switches for user instruction input which will be described later. The operating unit 109 may be a touch panel where the user input instructions by touching with a finger, touch pen, or the like, in which case the operating unit 109 serving as the touch panel may be provided on the front face of the display unit 108. In a case where the operating unit 109 is a touch panel, the aforementioned switches may also be provided, and the touch panel may be pressure-sensitive or may be an electrostatic type. In a case of an electrostatic type touch panel, the user's finger or a touch pen does not have to come into contact with the touch panel; instructions may be input by bringing the finger or touch pen closer to, or distancing from, the touch panel.

The image processing apparatus 100 further includes a network communication unit 110 to perform various types of communication with external devices, such as servers and the like, over a network, and a network connecting unit 111 which connects the network communication unit 110 to the network. The network communication unit 110 is capable of handling at least one of cable LANs and wireless LANs. In a case of cable LAN, the network connecting unit 111 is a connector to connect a cable LAN cable to the image processing apparatus 100, and in a case of wireless LAN, the network connecting unit 111 is an antenna.

The image processing apparatus 100 further has flash memory 112 such as non-volatile flash memory, which can store data which the network communication unit 110 has received. The components of the image processing apparatus 100 described above are connected by signal lines 113.

The program memory 106 described above also stores a client application 115 serving as a program which enables the network communication unit 110 to communicate with an external information processing server. That is to say, the functions of the client application 115 are realized by the CPU 105 executing the programs of the client application 115, one of which is enabling communication with the information processing server.

Figure 2:
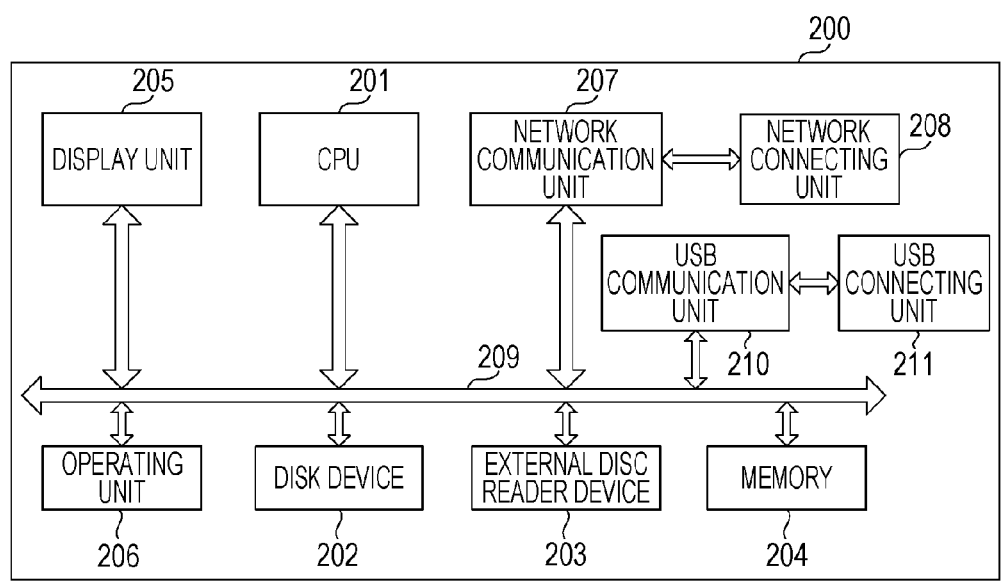
FIG. 2 is a block diagram illustrating the configuration of a client PC, serving as an example of an execution instructing apparatus, and an information processing server PC, serving as an example of an information processing server.

FIG. 2 is a block diagram illustrating the configuration of a client PC, serving as an example of an execution instructing apparatus, and an information processing server PC, serving as an example of an information processing server. Note that the execution instructing apparatus in the present embodiment is not restricted to a client PC, and may be any of a variety of apparatuses, such as cellular phones, smartphones, and other like mobile terminals.

A PC 200 operates as a client PC or information processing server PC. A CPU 201 is a control unit which controls each part of the PC 200. A disk device 202 is nonvolatile memory which stores various programs such as application programs, an operation system (OS), various types of files, and so forth. The disk device 202 also stores a Web browser for browsing Web sites. Reference numeral 203 denotes an external disc read device to read the contents of external storage media such as CD-ROMs and the like. Memory 204 is memory for temporary storage, buffering, and so forth, of data as necessary by the CPU 201.

In such a configuration, the CPU 201 loads programs stored in the disk device 202 to the memory 204 and executes the programs, thereby controlling each part of the client PC or information processing server PC. Note that the client PC or information processing server PC is not restricted to having one processor, and that the client PC or information processing server PC may be controlled by multiple processors working collaboratively. Further, the client PC or information processing server PC may include hardware such as circuits or the like which realize part or all of the processing of the present embodiment described below.

A display unit 205 is a display device such as an LCD or the like, and an operating unit 206 is an operating device such as a keyboard, mouse, and so forth. In the same way as the case of the operating unit 109 of the image processing apparatus 100, the operating unit 206 may be a touch panel where the user input instructions by touching with a finger, touch pen, or the like, in which case the operating unit 206 serving as the touch panel may be provided on the front face of the display unit 205. In a case where the operating unit 206 is a touch panel, the touch panel may be pressure-sensitive or may be an electrostatic type, which is also the same as with the case of the operating unit 109.

A network communication unit 207 is for connecting the PC 200 to a network to perform various types of communication, and a network connecting unit 208 connects the network communication unit 207 to the network. The network communication unit 207 and network connecting unit 208 are capable of handling at least one of cable LANs and wireless LANs, the same as with the image processing apparatus 100, assuming functions and forms necessary for the LANs being handled, in the same way as with the network communication unit 110 and network connecting unit 111 built into the image processing apparatus 100. Signal lines 209 connect the above components.

A USB communication unit 210 is for communicating with various types of image processing apparatuses via a USB interface, and a USB connecting unit 211 is a connecting unit such as a USB connector or the like.

Figure 3:
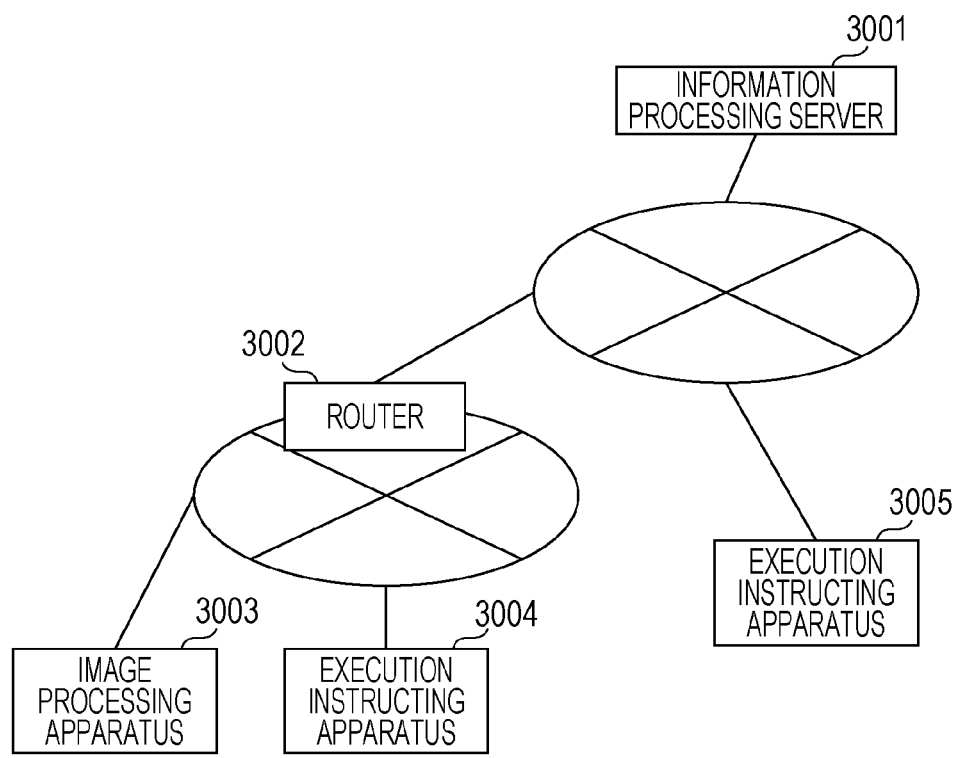
FIG. 3 is a diagram illustrating an example of a system including the image processing apparatus, execution instructing apparatus, and information processing server.

FIG. 3 is a diagram illustrating a system including an image processing apparatus, execution instructing apparatuses, and an information processing server. The image processing apparatus 3003 illustrated in FIG. 3 has the constitution elements of the image processing apparatus 100 described in FIG. 1. The information processing server 3001 and the execution instructing apparatuses 3004 and 3005, illustrated in FIG. 3, each have the constitution elements of the PC 200 described in FIG. 2.

The information processing server 3001 is a Web server connected to the Internet or the like via a public line or the like, and has been allocated a global internet protocol (IP) address for identification of the information processing server 3001. The information processing server 3001 also has allocated thereto a uniform resource locator (URL) serving as location information thereof, for external access thereto. A user obtains this URL as a link from a Web site or from a search site. Once obtained, this URL is fixed for all practical purposes, and can be registered in an execution instructing apparatus by Web browser functions such as bookmarking. The execution instructing apparatus can access this information processing server 3001 by operating a Web browser following the URL which the user has input or which has been registered in the Web browser.

A router 3002 serves to construct a LAN. The execution instructing apparatus 3004 is in a state of being capable of accessing URLs of servers from the LAN, via the router 3002, an Internet service provider (ISP) omitted from illustration, and so forth.

The image processing apparatus 3003 is connected to the LAN constructed including the router 3002. The image processing apparatus 3003 also is allocated an IP address which is valid within the LAN by a dynamic host configuration protocol (DHCP) information processing server within the router, and thus has a temporary URL capable of access from within the LAN. This URL will also be referred to as private URL hereinafter.

For example, in a case where the LAN has been constructed as a wireless LAN, the network connecting unit 208 of the execution instructing apparatus 3004 operates as a wireless LAN unit. If the execution instructing apparatus 3004 is within range of this wireless LAN, the execution instructing apparatus 3004 can control the image processing apparatus 3003 by a communication method without going through Internet or the information processing server 3001.

On the other hand, in a case where the LAN has been constructed as a cable LAN, the network connecting unit 208 interfaces with the LAN by cable, via a LAN cable or the like connected thereto. There are cases where the network connecting unit 208 is connected to a LAN module capable of connecting to the LAN. In this case, the image processing apparatus 3003 can control the image processing apparatus 3003 via the wired LAN, without going through the Internet or the information processing server 3001.

Thus, the execution instructing apparatus 3004 connected to the LAN can access the image processing apparatus 3003 via the LAN if the private URL of the image processing apparatus 3003 is recognizable. The execution instructing apparatus 3004 can also access the URL of the information processing server 3001 via the router 3002.

The execution instructing apparatus 3005 is connected to the information processing server 3001 via the Internet, and can access the information processing server 3001 from outside of the LAN via another ISP. In this state, the execution instructing apparatus 3005 can control the image processing apparatus 3003 by communicating with the image processing apparatus 3003 in accordance with a communication method going through the information processing server 3001 and router 3002. Note however, in this state, the execution instructing apparatus 3005 is outside of the LAN. Accordingly, even if the execution instructing apparatus 3005 recognizes the private URL of the image processing apparatus 3003, the execution instructing apparatus 3005 cannot access the private URL of the image processing apparatus 3003.

The LAN illustrated in FIG. 3 is constructed within a home or an office, for example. When an execution instructing apparatus is at a location where this LAN is installed, such as within a home or an office, the execution instructing apparatus can connected to this LAN. In this state, the execution instructing apparatus can control the image processing apparatus 3003 via the LAN, without going through the Internet or information processing server 3001.

For example, an execution instructing apparatus (e.g., a smartphone) may be connected to a LAN where an image processing apparatus (e.g., a scanner) is connected. The smartphone can control the scanner to give scan instructions of an original, transfer the read image of the original to the smartphone, and so forth, without going through the Internet or the information processing server 3001. Accordingly, communication time can be reduced as compared to a case of executing a scan via the Internet and information processing server 3001. However, if the smartphone is not connected to the LAN, the smartphone cannot use the LAN to cause the scanner to read an original.

Accordingly, the execution instructing apparatus (e.g., a smartphone) according to the present embodiment is enabled to control the image processing apparatus (e.g., a scanner) through the Internet or the like via a public line or the like, information processing server 3001, and router 3002. Accordingly, even when the user of the smartphone, for example, is away from the home or office where the LAN is constructed, the scanner can be given instructions to read the original, and the read image can be acquired.

In a case of an execution instructing apparatus such as a smartphone causing an image processing apparatus such as a scanner to execute processing, the user may select whether to perform processing via the LAN or processing via the information processing server 3001, for example, in some cases. In this sort of situation, the user may select processing via the information processing server 3001 even though the smartphone is at a location capable of connecting to the LAN, for example. In this case, connection to the Internet and access to the information processing server 3001, which are unnecessary for processing via the LAN, have to be performed.

Accordingly, in the present embodiment, upon input of a processing instruction to be performed by the image processing apparatus, the execution instructing apparatus determines whether or not this processing can be executed via the LAN. If determination is made that processing can be executed via the LAN, this processing is executed using the LAN even if communication can be made with the information processing server 3001. On the other hand, if determination is made that processing cannot be executed via the LAN, this processing is executed using communication via the information processing server 3001.

Accordingly, even if a user using an execution instructing apparatus capable of connecting to the LAN unwittingly instructs control via the information processing server 3001, for example, LAN connection is automatically performed, and the execution instructing apparatus cause the image processing apparatus to execute this processing using the LAN. Thus, the above control can be performed more speedily, since the execution instructing apparatus can access the image processing apparatus 3003 faster than a case of accessing the information processing server 3001.

On the other hand, in a case where the execution instructing apparatus is a location from which connection cannot be made to the LAN, processing is executed via the information processing server 3001, so processing can be appropriately executed even if the user of the execution instructing apparatus is at a location away from the image processing apparatus 3003.

Specifically, in the present embodiment, the execution instructing apparatus attempts to communicate with the image processing apparatus 3003 via the LAN, using the private URL of the image processing apparatus 3003. If the execution instructing apparatus succeeds in connecting to the image processing apparatus 3003 via the LAN (without going through the information processing server 3001), the image processing apparatus 3003 is controlled using this connection. Details of the aforementioned processing will be described later.

Note that in the present embodiment, the private address used to access the image processing apparatus 3003 via the LAN is uploaded to the information processing server 3001 by the image processing apparatus 3003 itself, so as to be reregistered in the information processing server 3001. The execution instructing apparatus 3005 attempts to communicate with the image processing apparatus 3003 via the LAN, by obtaining and referencing the private address registered in the information processing server 3001. This private address registration processing, and control processing of the image processing apparatus 3003 by the execution instructing apparatus, will be described next in detail.

FIGS. 4A and 4B are flowcharts illustrating processing of registering a private address, for access to the image processing apparatus 3003, in the information processing server 3001. FIG. 4A illustrates processing performed by the image processing apparatus 3003, and FIG. 4B illustrates processing by the information processing server 3001. The processing of FIGS. 4A and 4B will be described assuming that an account necessary to access the information processing server 3001 has already been created, and that the user has already input an account name and password for this account to the image processing apparatus 3003. The flowcharts illustrated in FIGS. 4A and 4B are periodically executed in a state where the power of the image processing apparatus 3003 is on.

Programs corresponding to the flowcharts illustrated in FIGS. 4A and 4B are stored in the program memory 106 of the image processing apparatus 3003 and the disk device 202 of the information processing server 3001, respectively. The CPU 105 of the image processing apparatus 3003 and the CPU 201 of the information processing server 3001 each read these programs to the work memory 107 and the memory 204 and execute the programs, thereby carrying out the flowcharts illustrated in FIGS. 4A and 4B.

In step 4000, the image processing apparatus 3003 determines whether or not there is a need to generate a private address to access the image processing apparatus 3003 via the LAN. Note that a DHCP information processing server assigns the local IP address of the image processing apparatus 3003 in the present embodiment. A validity period (e.g., 24 hours or the like) is set for the local IP address by the DHCP information processing server. In this step 4000, the image processing apparatus 3003 measures the time from having obtained local IP address in step 4001, and determines whether or not the measured time exceeds the aforementioned validity period. Note that the router 3002 may serve as the DHCP server in the present embodiment, or a separate apparatus may be provided as the DHCP server.

Also, the local IP address may become invalid if the power of the image processing apparatus 3003 goes off. Accordingly, determination is made in step 4000 that generating of a private address is necessary if the validity period of the local IP address has expired, or if the power has gone off since the last time the local IP address was obtained.

In step 4001, the image processing apparatus 3003 performs communication with the aforementioned DHCP information processing server and obtains a local IP address which can be used on the LAN, and the validity period of that local IP address. The validity period obtained in step 4001 is used in the determination in the step 4000.

In step 4002, the image processing apparatus 3003 generates a private address for access to the image processing apparatus 3003, based on the local IP address obtained in step 4001. Specifically, the image processing apparatus 3003 adds a scheme such as "http", and adds a path name to distinguish from other services.

In step 4003, the image processing apparatus 3003 performs authentication by transmitting the account name and password input by the user to the information processing server 3001 as account information, and communicating with the information processing server 3001.

In step 4004 the image processing apparatus 3003 determines whether or not the authentication was successful, based on whether authentication information indicating successful authentication was received from the information processing server 3001, or an error notification was received. In a case where an error notification has been received, the image processing apparatus 3003 makes an error display on the display unit 108.

In step 4005, the image processing apparatus 3003 transmits the authentication information received in step 4004, along with the private address generated in step 4002, to the information processing server 3001. Note that the model name of the image processing apparatus 3003 is transmitted in step 4005 along with the private address.

In step 4006, determination is made regarding whether or not registration has been completed based on whether or not notification has been made from the information processing server 3001 to the effect that the private address has been registered. If registration has been completed, the processing ends. In a case where registration has not been completed, the private address is transmitted again in step 4005.

If the image processing apparatus 3003 has authentication information at the time of executing the processing in FIG. 4A, the processing of steps 4003 and 4004 may be skipped, and the authentication information which the image processing apparatus 3003 has being transmitted in step 4005 along with the private address. In this case, if transmission of the private address is unsuccessful, and an error notification is received from the information processing server 3001, there is a possibility that a timeout period of the authentication information has expired. Accordingly, in a case where the image processing apparatus 3003 receives an error notification, authentication information is acquired again by the processing in steps 4003 and 4004, and thereafter the private address is transmitted again.

FIG. 4B illustrates processing executed at the information processing server 3001 in a case where the information processing server 3001 has been accessed by an external apparatus.

In step 4010, the information processing server 3001 determines whether or not the external apparatus which has made this access has been authenticated. If this determination finds that authentication information has been received from the external apparatus and that this authentication information has been issued by the information processing server 3001, the external apparatus is determined to have been authenticated. Alternatively, determination may also be made regarding whether or not the validity period of the authentication information has expired. If the timeout period has expired, determination is made in step 4010 that the external apparatus is not authenticated, even if the authentication information has been issued by the information processing server 3001. In a case where determination is not made in step 4010 that the external apparatus has been authenticated, the flow advances to step 4011.

In step 4011, the information processing server 3001 determines whether or not account information has been received from the image processing apparatus 3003. For example, in a case where the image processing apparatus 3003 has transmitted account information in step 4003 in FIG. 4A, determination is made that the account information has been received. In this case, the information processing server 3001 performs authentication processing in step 4012. Specifically, the account information already registered in the disk device 202 of the information processing server 3001 (account name and password) is compared with the account information received in step 4011. In a case where the received account information has already been registered, the information processing server 3001 determines that authentication of the image processing apparatus 3003 has been successful. In step 4013, authentication information is transmitted to the image processing apparatus 3003 in a case where authentication is successful in step 4012, and error information if authentication fails. Determination is made in step 4004 in FIG. 4A based on the information transmitted in step 4012.

In a case where determination is made in step 4010 that the account has been authenticated, the flow advances to step 4014. An example of a case of determination that the account has been authenticated in step 4010 is a case where an external apparatus regarding which authentication information has been newly issued in step 4013 access again using that authentication information. Another example is a case of access by an apparatus which already holds authentication information in the processing in FIG. 4B.

In step 4014, the information processing server 3001 determines whether or not a private address has been received form the image processing apparatus 3003. In a case where the image processing apparatus 3003 has transmitted the private address in step 4005 in FIG. 4A, determination is made in step 4014 that the private address has been received, and the flow advances to step 4015.

In step 4015, the private address received in step 4014 is saved in the disk device 202 in a manner correlated with the account information received in step 4011, thereby registering the private address.

In step 4016, the image processing apparatus 3003 is notified that registration of the private address has been completed. Determination of whether or not registration has been completed is made in the aforementioned step 4006 based on whether or not this notification has been made.

In a case where determination is not made in step 4014 above that the private address has been received, the flow advances to step 4017. Determination is made in step 4017 regarding whether or not the accessing external apparatus has made an execution request for predetermined processing.

An example of this predetermined processing is downloading of data stored in the information processing server 3001 or another server connected to the information processing server 3001, to the relevant external apparatus. Another example is the information processing server 3001 receiving data from the relevant external apparatus and storing this data in the information processing server 3001 or another server connected to the information processing server 3001. Other various types of processing may be the predetermined processing in the present embodiment.

Now, in a case where the information processing server 3001 manages private addresses used on the LAN as described with reference to FIGS. 4A and 4B, there may be cases where the same private address is registered in duplicate. While the DHCP information processing server in the router can assign unique addresses within the LAN, it cannot recognize addresses assigned to other LANs. Accordingly, the same address may be assigned at multiple LANs, and such duplication may occur in a case of the information processing server 3001 collecting private addresses from multiple LANs, as illustrated in FIG. 4.

Accordingly, an arrangement may be made where identification information of the image processing apparatus 3003 is registered in the information processing server 3001 along with the private address of the image processing apparatus 3003. Accordingly, even if private addresses are registered in duplicate, the image processing apparatus 3003 corresponding to the address can be uniquely identified. A management method of private addresses based on such identification information will be described later with reference to FIG. 12 and other drawings.

Examples of the above-described predetermined processing according to the present embodiment, performed at the information processing server 3001, will be made with reference to later-described FIGS. 5, 7, 9, and 11A through 11C. In a case where determination is made in step 4017 that a request to execute the predetermine processing, in step 4018 the information processing server 3001 executes such processing.

The image processing apparatus 3003 can register a private address for controlling the image processing apparatus 3003 via the LAN in the information processing server 3001 by the processing illustrated in FIGS. 4A and 4B. In a case where the validity period of the local IP address obtained in step 4001 has expired, or the power of the image processing apparatus 3003 goes off and is then turned on again, the private address becomes invalid, as described with regard to step 4000. The private address registration processing in FIG. 4A is executed in a case where the local IP address has become invalid in this way. That is to say, in a case where the IP address is reset under such conditions, the private address changes, and the changed private address can be appropriately registered in the information processing server 3001 by the processing in FIGS. 4A and 4B. Further, the registration processing thereof can be automatically executed, without the using having to give instructions for registration.

As described above, in a case where the validity period of the private address has expired, or the power of the image processing apparatus 3003 goes off, the private address thereof becomes invalid. Processing to prevent an invalid private address from remaining in the information processing server 3001 will be described with reference to FIG. 5.

Figure 5:
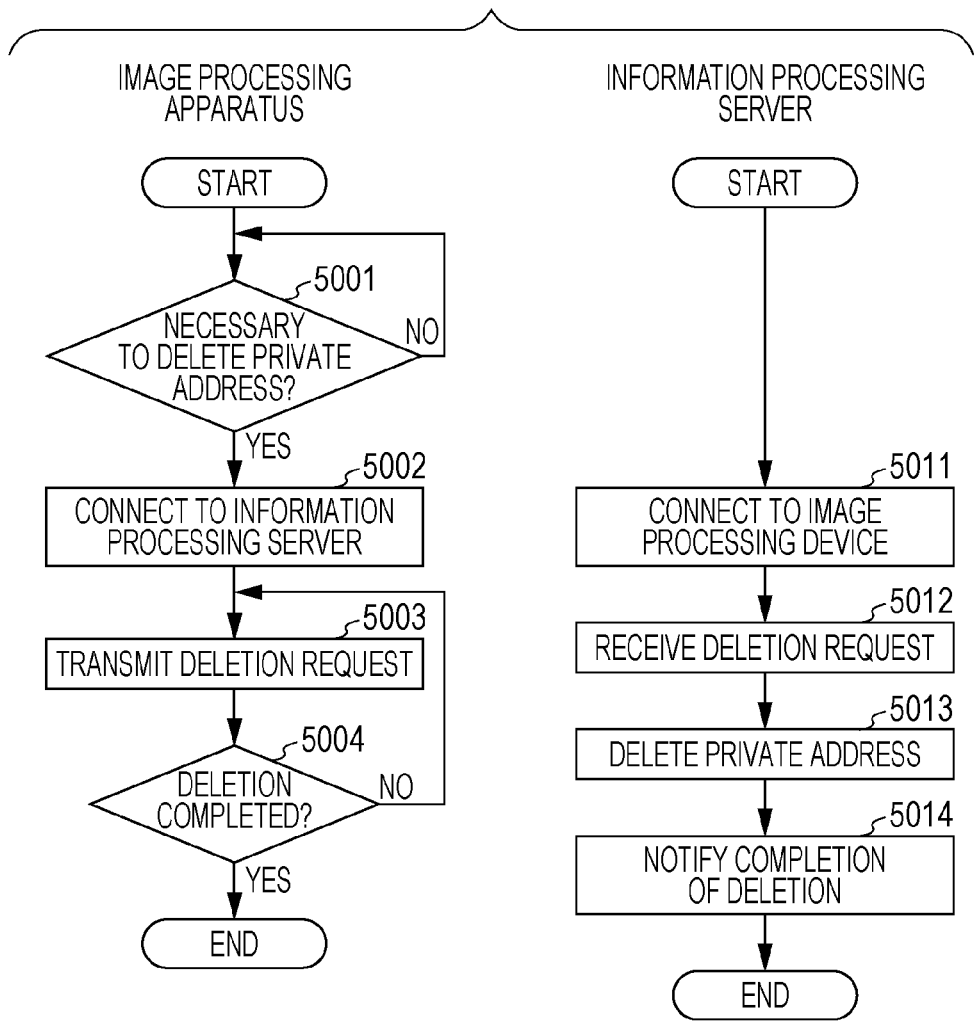
FIG. 5 is a flowchart illustrating an example of deletion (invalidation) of a private address within the information processing server when the power of the image processing apparatus goes off.

FIG. 5 is a flowchart illustrating an example of deletion (invalidation) of private addresses within the information processing server 3001 when the power of the image processing apparatus goes off. The processing illustrated in FIG. 5 is realized by the CPU 105 of the image processing apparatus 3003 and the CPU 201 of the information processing server 3001, in the same way as with the case illustrated in FIGS. 4A and 4B. Note that the term "delete" in the present embodiment is not restricted to a case of overwriting information to be deleted with other information, and includes processing to control memory so that the information to be deleted is not referenced.

In step 5001, the image processing apparatus 3003 determines whether or not deletion of a private address registered in the information processing server 3001 is necessary, based on whether or not the private address will be invalid. Specifically, determination is made that this deletion is necessary in a case where the user instructs the operating unit 109 of the image processing apparatus 3003 to turn off the power, or the validity period of the private address has expired.

In step 5002, the image processing apparatus 3003 makes connection with the information processing server 3001. Specifically, the image processing apparatus 3003 transmits an account name and password to the information processing server 3001 for authentication. If authentication is successful the flow advances to step 5003, but if authentication fails, either a prompt is displayed to re-enter the account name and password, or the flow is aborted. The processing in step 5002 is the same as the processing in steps 4003 and 4004 in FIG. 4A. Alternatively, an arrangement may be made where connection is performed by transmitting authentication information to the information processing server 3001 in step 5002.

On the other hand, in step 5011 the information processing server 3001 connects to the image processing apparatus 3003 in accordance with step 5002 at the image processing apparatus 3003. The processing in step 5011 is the same as the processing in steps 4010 through 4013 in FIG. 4B.

Upon the above connection having been made, in step 5003 the image processing apparatus 3003 transmits a deletion request to the information processing server 3001, to delete a private address of itself that has been registered. This deletion request is transmitted along with account information of the image processing apparatus 3003, for example, so that the information processing server 3001 can recognize that the private address to be deleted is that of the image processing apparatus 3003.

In step 5012, the information processing server 3001 receives the deletion request and account information transmitted from the image processing apparatus 3003 in step 5003.

Upon receiving the deletion request, in step 5013 the information processing server 3001 deletes the private address stored in the disk device 202 in a manner corresponding to the account information received along with the deletion request. The information processing server 3001 then notifies the image processing apparatus 3003 that deletion of the private address has been completed, and the processing ends.

In step 5004, the image processing apparatus 3003 the determines whether or not deletion of the private address has been completed, based on whether or not the notification transmitted from the information processing server 3001 in step 5013 has been received. In a case where deletion is determined to not have been completed, in step 5003 the image processing apparatus 3003 repeats the deletion request.

Upon the image processing apparatus 3003 determining that deletion has been completed in step 5004, the flow ends. Note however, in a case where power off has been instructed by the user in the processing in FIG. 5, processing to turn off the power of the image processing apparatus 3003, and various types of processing executed at the time of turning the power off, are executed.

According to the processing illustrated in FIG. 5, a situation can be prevented where the private address of the image processing apparatus 3003 becomes in valid and the invalid private address remains registered in the information processing server 3001.

While the deletion processing in FIG. 5 is primarily performed by the image processing apparatus 3003, the present invention is not restricted thusly. For example, an arrangement may be made where the information processing server 3001 periodically deletes private addresses of image processing apparatuses regarding which no access has been made for a predetermined time period, and delete registration information deemed to be unnecessary. Alternatively, the user may access the information processing server 3001 and directly erase unnecessary information.

Further, in a case where the private address of the image processing apparatus 3003 will become invalid, re-registration processing of the changed private address described by way of FIGS. 4A and 4B, and the deletion processing of the private address before changing described by way of FIG. 5, are executed. At this time, one or the other of the re-registration processing and deletion processing may be performed first, or both may be performed at the same time. Further, the present invention is not restricted to an arrangement where authentication processing is performed between the image processing apparatus 3003 and the information processing server 3001 for each of the re-registration processing and deletion processing, and both may be executed at one authentication.

In the present embodiment, an execution instructing apparatus can obtain, from the information processing server 3001, the private address of the image processing apparatus 3003 that has been registered in the information processing server 3001 by the processing illustrated in FIGS. 4A and 4B above. The execution instructing apparatus then attempts to access the image processing apparatus 3003 via the LAN, using the obtained private address. This processing will be described in detail next.

The present embodiment will be described by way of an example where a LAN has been constructed in a home. Description will be made regarding an example where the user of the execution instructing apparatus controls the image processing apparatus 3003 to read an original via the LAN at home, and via the Internet when away from home.

Figure 6:
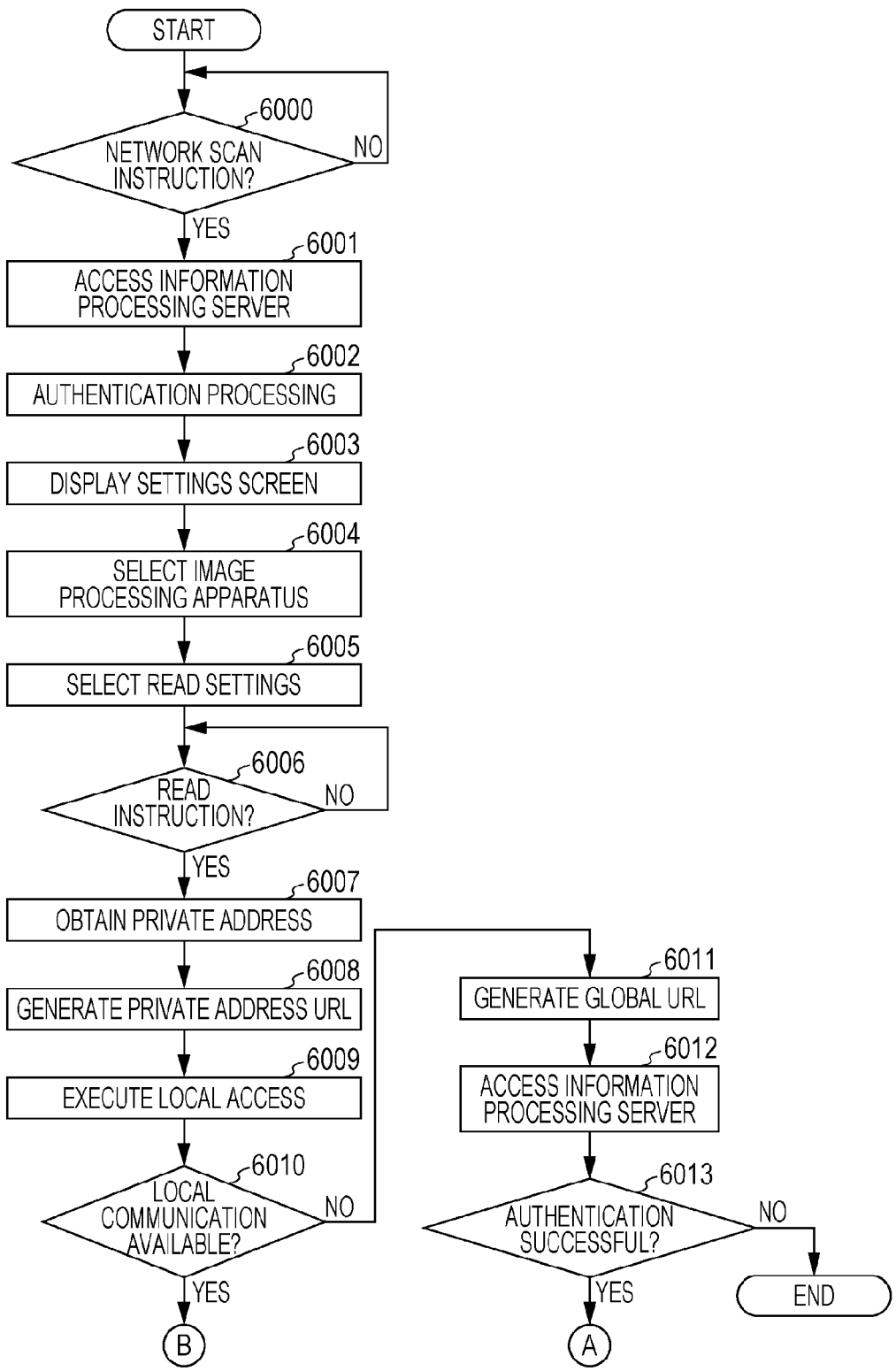
FIG. 6 is a flowchart illustrating an example of processing by the execution instruction apparatus.

FIG. 6 is a flowchart illustrating an example of processing by an execution instructing apparatus. In step 6000, the execution instructing apparatus determines whether or not the user has used the operating unit 206 of the execution instructing apparatus to input an execution instruction for reading an original via the information processing server 3001 (network scan). In a case where an application for network scanning is installed in the execution instructing apparatus for example, the aforementioned execution instruction is input by the user performing an instruction as to an icon or the like to activate the application. Alternatively, an arrangement may be made where, in a case in which a certain Web page is displayed in a Web browser of the execution instructing apparatus, the aforementioned execution instruction is input by instructing a certain button in the Web page. In a case where determination is made in step 6000 that the user has input a network scan execution instruction, the flow advances to step 6001.

In step 6001, the execution instructing apparatus executes a Web browser program stored in the disk device 202 to access the information processing server 3001 by the Web browser. The address for accessing the information processing server 3001 may be stored in the disk device 202 beforehand, or may be searched using a search service, or the user may manually input a character string listed in a product manual or the like. Alternatively, the address of the information processing server 3001 may be saved by a saving function of the Web browser, so as to be used to access the information processing server 3001 thereafter, using the saved address.

Upon the information processing server 3001 having been accessed in step 6001, the flow advances to step 6002.

In step 6002, the execution instructing apparatus performs authentication processing to use the network scan. For example, display data for an authentication screen (e.g., HyperText Markup Language (HTML) data) is transmitted from the information processing server 3001 to the execution instructing apparatus, and the authentication screen is displayed at the execution instructing apparatus.

Figure 8:
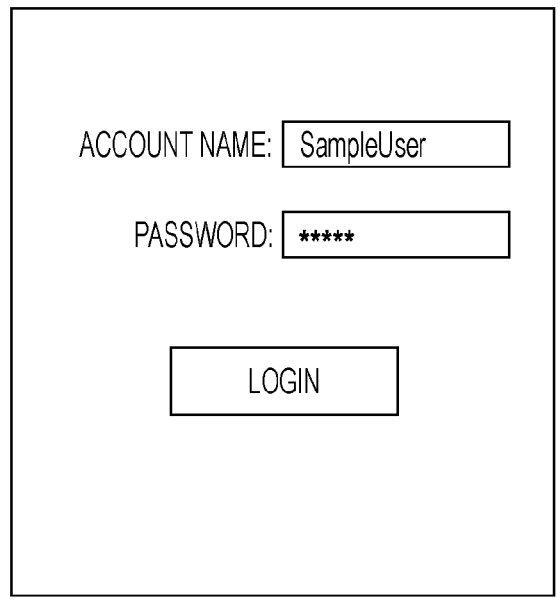
FIG. 8 is a diagram illustrating an example of an authentication screen.

FIG. 8 is a diagram illustrating an example of an authentication screen. The user inputs the account name and password at this authentication screen in FIG. 8, and the execution instructing apparatus transmits this information to the information processing server 3001. This information is compared with information registered in the information processing server 3001 beforehand, thus performing authentication. In a case where the account name and password are stored in the execution instructing apparatus for example, authentication processing may be performed where this information is automatically transmitted to the information processing server 3001, without displaying a screen such as illustrated in FIG. 8.

Upon the authentication processing of step 6002 being completed the flow advances to step 6003.

In step 6003, the execution instructing apparatus receives, from the information processing server 3001, user interface (UI) data corresponding to a settings screen for accepting user instructions regarding original reading settings. This UI data is described in HTML, for example. The execution instructing apparatus displays the aforementioned settings screen based on the received UI data, by the above-described Web browser function.

FIG. 11A is a diagram illustrating an example of a read settings screen. The user can select the image processing apparatus to execute reading of the original from the "DEVICE NAME" portion in the settings screen illustrated in FIG. 11A. For example, a list of image processing apparatuses may be displayed as selection candidates, and the user may select an image processing apparatus from the list. Note that the image processing apparatuses which are selection candidates here, are image processing apparatuses which have been registered at the information processing server 3001 by the processing illustrated in the flowchart in FIGS. 4A and 4B. The name of the model of the image processing apparatus which has been transmitted in the above-described step 4005 is displayed in the "DEVICE NAME" portion in FIG. 11A. The information processing server 3001 gives each image processing apparatus unique identification information, so that in a case where there is a plurality of the same model, the character string listed in the "DEVICE NAME" portion in FIG. 11A is appended with a suffix "-x", for example. Note that the user may use the operating unit of the execution instructing apparatus to register an optional device name, for example, when registering an image processing apparatus.

In step 6004, an image processing apparatus to execute reading of the original is selected from the image processing apparatuses displayed as selection candidates in the settings screen in FIG. 11A, by user instructions through the operating unit 206. If there is only one image processing apparatus registered by the user, this step can be omitted, since the image processing apparatus to be used is uniquely determined. The steps 6001 through 6003 do not have to be performed in the order in FIG. 6; the image processing apparatus to be used may be selected first and authentication processing performed thereafter.

In step 6005, the execution instructing apparatus selects read settings to be used for reading of the original, by performing user instructions via the operating unit 206 at the settings screen illustrated in FIG. 11A. For example, the type of original, the size of the original, resolution, format in which to save the file, and other like settings are changed and/or selected according to user instructions. At the time of the image processing apparatus being registered at the information processing server 3001 in the processing in FIGS. 4A and 4B, read settings, which that image processing apparatus is capable of executing, are notified from the image processing apparatus to the information processing server 3001. The candidates of read settings illustrated in FIG. 11A are what have been notified to the information processing server 3001 as described above.

In step 6006, the execution instructing apparatus determines whether the user has pressed the "READ IMAGE" button in the settings screen illustrated in FIG. 11A, so as to input a read execution instruction.

At the time of the settings screen in FIG. 11A being displayed in step 6003, a predetermined image processing apparatus and predetermined read settings may be displayed. In this arrangement, the processing in steps 6004 and 6005 is not executed if the user presses the "READ IMAGE" button without changing the image processing apparatus or read settings, and the aforementioned predetermined image processing apparatus and predetermined read settings are employed. Upon the read execution instruction being input by the user in step 6006, the flow advances to step 6007.

The processing from step 6007 on is access processing by the execution instructing apparatus via the LAN, and so forth. At this time, the UI may be changed from the display illustrated in FIG. 11A to display a settings screen such as illustrated in FIG. 11B, indicating that processing is being performed. This enables the user to recognize that reading of the original has been instructed by the user and processing is being performed.

In step 6007, the execution instructing apparatus requests the information processing server 3001 for the private address of the image processing apparatus 3003 that has been set in step 6003, and obtains this private address from the information processing server 3001. This request includes information identifying the image processing apparatus selected by the user. This private address has been transmitted from the image processing apparatus 3003 to the information processing server 3001 in step 4005 in FIG. 4A, and saved at the information processing server 3001 in step 4015 in FIG. 4B. This is the saved private address which is obtained in step 6007.

In step 6008, the execution instructing apparatus generates a private URL for accessing the image processing apparatus via the LAN, from the image read settings set in step 6004 and the private address obtained in step 6006. For example, a private URL such as http://192.168.0.10/Scan?Type=Doc&Size=A4&Res=300&Format=JEPG is generated.

The LAN according to the present embodiment enables access to the image processing apparatus selected in step 6004 using the above private URL. The image processing apparatus can obtain the read settings selected in step 6005, in accordance with the accessing apparatus using the private URL.

Alternatively, an arrangement may be made where the format of read settings is differently described in the private URL for each image processing apparatus, with URLs being generated following the format according to the image processing apparatus selected in step 6004. Also, while description has been made regarding an arrangement where the execution instructing apparatus generates the private URL, an arrangement may be made where read settings which the user has selected are transmitted to the information processing server 3001 where the private URL is generated, and returned to the execution instructing apparatus.

In step 6009, the execution instructing apparatus executes access processing to the image processing apparatus selected by the user, following the private URL created in step 6007. This access is performed without screen transition, using an XMLHttpReqeust or the like, for example.

In step 6010, the execution instructing apparatus determines whether communication can be made with the image processing apparatus via the LAN, without going through an external network such as the Internet or the like, based on the response to the access processing executed in step 6009. The execution instructing apparatus has to be connected to the LAN corresponding to the private address obtained in step 6006 for the execution instructing apparatus to be communicable with the image processing apparatus. In a case where the execution instructing apparatus is connected to the LAN, access can be made via the LAN without going through an external network. However, if the execution instructing apparatus is accessing from an external network, direct access via the LAN cannot be performed.

In a case where the execution instructing apparatus is away from a LAN environment, such as the execution instructing apparatus 3005 in FIG. 3, the execution instructing apparatus cannot access the image processing apparatus 3003 via the LAN. For example, in a case where a LAN is constructed in the home, and the user of the execution instructing apparatus is away from home, the user cannot access the image processing apparatus 3003 via the LAN from where he/she is. On the other hand, in a case where the execution instructing apparatus is in a LAN environment, such as the execution instructing apparatus 3004 in FIG. 3 (e.g., when the user of the execution instructing apparatus is at home), the execution instructing apparatus can access the image processing apparatus 3003 via the LAN.

In a case where determination is made in step 6010 that local communication is available, the flow advances to processing described later with reference to FIG. 10, where the read image is acquired and displayed. Details will be described later. On the other hand, in a case where determination is made that local communication is not available, reading of the original by the image processing apparatus is controlled via the information processing server 3001 in the processing of step 6011 and thereafter.

In step 6011, the execution instructing apparatus generates a URL for performing image reading via the information processing server 3001, since determination has been made in step 6010 that direct communication with the image processing apparatus on the LAN is not available via the LAN. First, the execution instructing apparatus obtains a URL for accessing the image processing apparatus selected in step 6003 and an authentication key from the information processing server 3001. Upon being requested for a URL and authentication key from the execution instructing apparatus, the information processing server 3001 uses random numbers, point-in-time, and so forth, to generate a character string uniquely identifying multiple execution instructing apparatuses registered at the information processing server 3001, and an authentication key for access control. The above-described acquisition is performed by transmitting the generated authentication key and the URL for accessing the image processing apparatus together to the execution instructing apparatus. The information processing server 3001 temporarily holds the authentication key and the validity period thereof. An example of a generated key is "ABCDEF123456789".

Next, the execution instructing apparatus generates parameters necessary for the image processing apparatus to read the original, from the image read settings set in step 6005. The execution instructing apparatus then uses the URL and authentication key obtained from the information processing server 3001, and the parameters, to generate a URL necessary to read an image. For example, a global URL such as http://www.example.com/ABCDEFGHIJK/Scan?Type=Doc&Size= A4&Res=300&Format=JEPG&KEY=ABCDEF123456789 is generated.

Unlike the private URL generated in step 6007, this global URL is capable of communication from outside of the LAN to which the image processing apparatus is connected. Names uniquely identifying multiple image processing apparatuses registered in the information processing server 3001 are embedded in the path, and an authentication key is added to prevent communication from an unauthenticated execution instructing apparatus.

While names uniquely identifying image processing apparatuses are embedded in the path in the present embodiment, these may be separately transmitted as parameters. Also, an authentication key is added to the URL as a method of determining accessibility, but other authentication methods may be used. In the same way as with step 6007, the present invention is not restricted to generating a global URL at the execution instructing apparatus, and an arrangement may be made where the global URL is generated at the information processing server 3001 and returned to the execution instructing apparatus.

In step 6012, the execution instructing apparatus accesses the information processing server 3001 following the global URL generated in step 6011. This access is performed without screen transition, using an XMLHttpReqeust or the like, for example, in the same way as with step 6008.

In step 6013, the execution instructing apparatus determines whether or not authentication was successful based on a response from the information processing server 3001 regarding the access in step 6012. Upon determination being made that authentication was successful, the processing described later with reference to FIG. 10 is executed (see e.g., reference letter "A" in each of FIGS. 6 and 10). On the other hand, if determination is made that authentication was not successful, the flow ends.

As described above, an execution instructing apparatus can obtain a private address of an image processing apparatus registered at an information processing server by the processing described in FIG. 6. If local communication can be performed by that private address, the execution instructing apparatus communicates with the image processing apparatus via the LAN. On the other hand, if local communication cannot be performed, the execution instructing apparatus communicates with the information processing server 3001 using the global URL.

Figure 7:
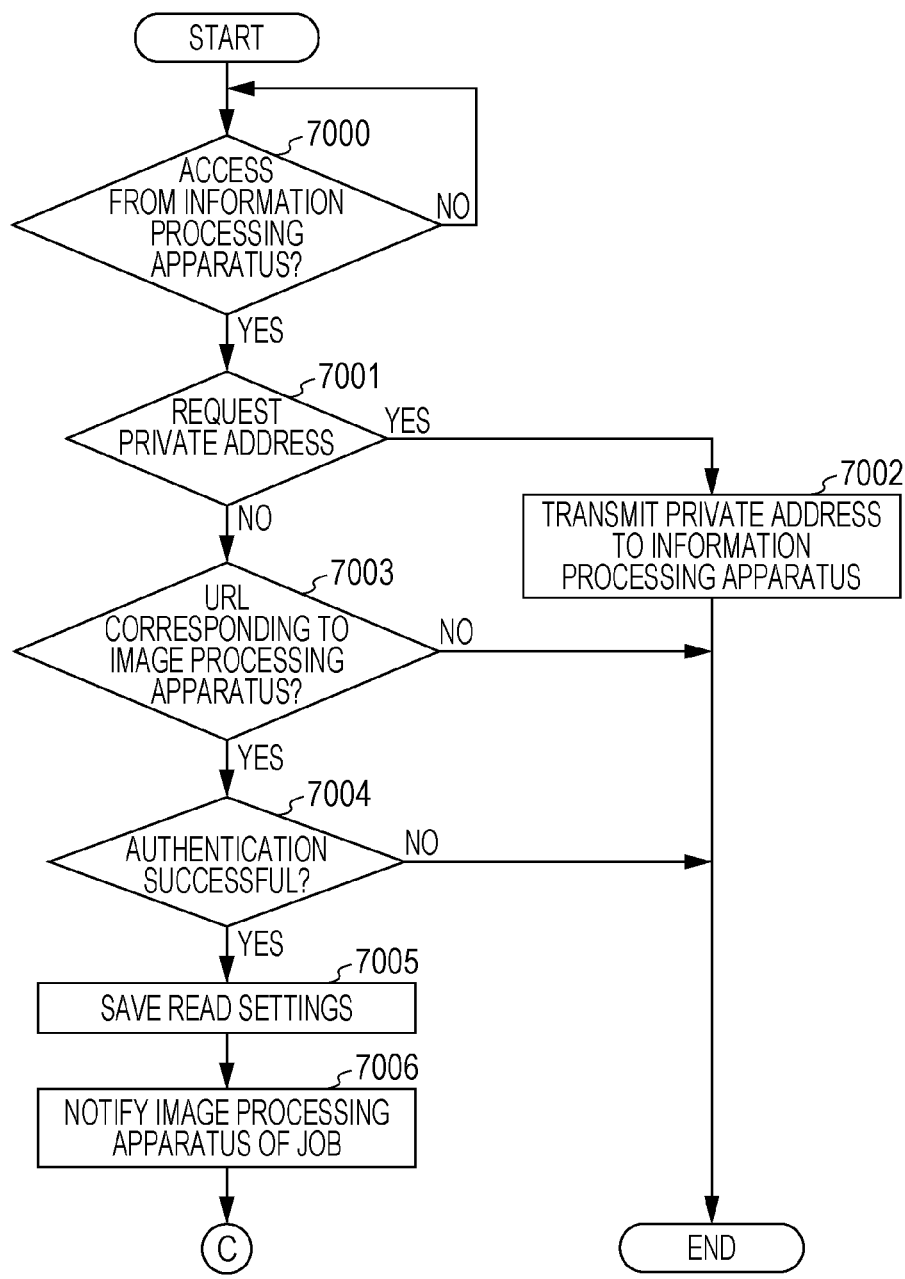
FIG. 7 is a flowchart illustrating an example of processing by the information processing server.

FIG. 7 is a flowchart illustrating an example of processing at the information processing server 3001. In step 7000, the information processing server 3001 determines whether or not there has been access from an execution instructing apparatus. In a case where determination is made that there has been access, the flow advances to step 7001.

In step 7001, the information processing server 3001 determines whether or not a private address for a particular image processing apparatus has been requested from an execution instructing apparatus. If an execution instructing apparatus requests the information processing server 3001 for the private address of the image processing apparatus selected by the user in step 6007, step 7001 yields a determination of Yes.

In step 7002, the information processing server 3001 identifies the image processing apparatus selected by the user, based on the information included in the aforementioned request, transmits the private address of the identified image processing apparatus to the execution instructing apparatus, and the flow ends. This transmission processing in step 7002 enables the execution instructing apparatus to obtain the private address in step 6007.

On the other hand, in a case where determination is made in step 7001 that the access is not a request for a private address, the flow advances to step 7003. In step 7003, the information processing server 3001 determines whether or not the access from the execution instructing apparatus is an access based on a URL corresponding to the image processing apparatus. In a case where the execution instructing apparatus has performed the access in step 6012 described above, step 7003 yields a determination of Yes, and the flow advances to step 7004.

In step 7004, the information processing server 3001 extracts the authentication key added to the URL used for the access from the execution instructing apparatus, and determines whether or not authentication has been successful with that authentication key. In the above-described example, the character string "ABCDEF123456789" which follows "KEY=" added as a parameter of the URL is the authentication key.

Next, the authentication key which the information processing server 3001 has issued to the execution instructing apparatus and temporarily saved in the information processing server 3001, is compared with the authentication key included in this access. The information processing server 3001 also checks whether the authentication key is within the validity period. In a case where the two match in the comparison, and further the authentication key is within the validity period, determination is made that access is permissible. In the above-described example, the authentication key set in step 6015 is "ABCDEF123456789", which matches that included in the URL, so determination is made that authentication is successful.

Upon determination being made in step 7004 that authentication has been successful, the flow advances to step 7005. Note that the results of the determination made in step 7004 are notified to the accessing execution instructing apparatus. Determination is made in the above-described step 6013 regarding whether or not authentication was successful based on the results notified in this manner. In a case where the authentication keys do not match and accordingly determination is made in step 7004 that authentication has not been successful, an error is notified to the execution instructing apparatus to the effect that authentication has failed, and the flow ends.

In step 7005, the information processing server 3001 generates a read job including the image read settings added to the above-described global URL as a parameter, and also including a storage URL within the information processing server 3001 which saves read images, and temporarily saves this read job. This job information is generated in the format of an eXtensible Markup Language (XML) file or the like.

In step 7006, the information processing server 3001 identifies the image processing apparatus corresponding to the global URL, which is to read the original. The information processing server 3001 then notifies that image processing apparatus that there is a job. This notification of the job is made to a certain image processing apparatus using eXtensible Messaging and Presence Protocol (XMPP) communication or the like, for example.

The processing described with FIG. 7 enables the information processing server 3001 to notify the image processing apparatus which the user has selected at the execution instructing apparatus that there is a job including read settings which the user has set. That is to say, in a case where determination is made in the processing in FIG. 6 that the execution instructing apparatus cannot perform local communication with the image processing apparatus, the execution instructing apparatus communicates with the information processing server using the global URL. The image processing apparatus can be notified of the job via the information processing server 3001.

Figure 9:
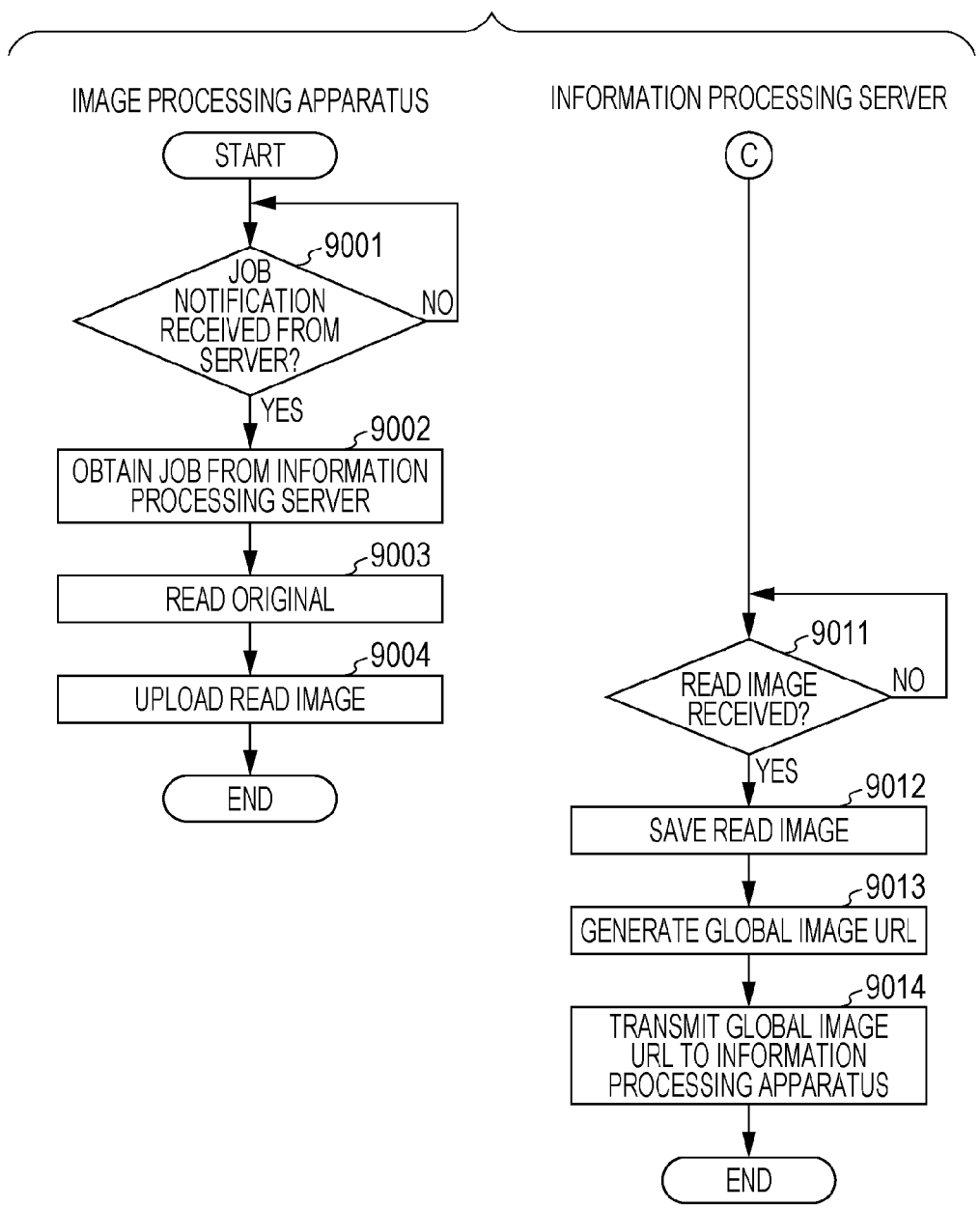
FIG. 9 is a flowchart illustrating processing performed when the image processing apparatus receives notification of a job.

FIG. 9 is a flowchart illustrating processing at the time of the image processing apparatus receiving a job notification. In step 9001, the image processing apparatus determines whether or not the job notification from the information processing server 3001 has been received in the above-described step 7006 (see e.g., reference letter "C" in FIGS. 7 and 9 showing that, in one or more embodiments, the flowcharts of FIGS. 7 and 9 may be related or employed together).

In step 9002, the image processing apparatus accesses the information processing server 3001 and obtains the job.

In step 9003, the image processing apparatus reads the original in accordance with the read settings described in the job obtained in step 9002, and temporarily saves the read image of the original in work memory 107.

In step 9004 the image processing apparatus uploads the read image, temporarily saved in step 9003, to the storage URL for saving the read image, that is described in the job obtained in step 9002. Note that the invention is not restricted to the upload destination being internal storage in the information processing server 3001, and that an arrangement may be made where an upload is directly performed to an external storage service. In this case, upon completion of authentication to the external storage service, and of the upload, notification is made to the information processing server 3001 that the upload has been completed.

On the other hand, in step 9011 the information processing server 3001 determines whether or not the read image has been received from the image processing apparatus. Determination is made that the read image has been received in step 9011, upon the read image is transmitted by the upload processing by the image processing apparatus 3003 in step 9004. Upon the read image being received, the flow advances to step 9012.

In step 9012, the information processing server 3001 stores the read image received from the image processing apparatus in internal storage. In step 9013, the information processing server 3001 generates a global image URL corresponding to this read image, so that the read image is externally accessible.

Note that when storing the image, the information processing server 3001 may save the image in internal or external storage different from that where the job transmitted to the image processing apparatus is stored. In this case, the global image URL is a different URL from the storage URL included in the job in step 7006. This can improve security.

In step 9014, the information processing server 3001 returns the global image URL generated in step 9013 as a response to the access from the execution instructing apparatus in step 7000. Note that an arrangement may be made where actual data of the read image is transmitted in step 9014, instead of the URL. Alternatively, an image where the pixel count of the read image has been reduced (thumbnail image) may be transmitted along with the above-described global image URL.

According to the processing described above with FIG. 9, the image processing apparatus reads an original according to the job received from the execution instructing apparatus via the information processing server 3001, and uploads the read image. The information processing server 3001 then transmits a global image URL for access to the uploaded image, to the execution instructing apparatus.

FIG. 10 is a flowchart illustrating processing of the execution instructing apparatus obtaining the read image via the LAN or via the information processing server 3001 (see e.g., reference letters "A" and "B" in FIGS. 6 and 10 showing that, in one or more embodiments, the flowcharts of FIGS. 6 and 10 may be related or employed together). In step 1001, the execution instructing apparatus determines whether or not the global image URL transmitted from the information processing server 3001 in step 9014 has been received. The aforementioned thumbnail image may be received along with the global image URL.

Upon determination being made in step 1001 that the global image URL has been received, in step 1002 a download image is displayed for the user of the execution instructing apparatus to use to download the read image. FIG. 11C is a diagram illustrating an example of a download image. A thumbnail image of the read image is received along with the global image URL in the present embodiment. The thumbnail image is displayed along with a download button, as illustrated in FIG. 11C.

In step 1003, determination is made regarding whether the user has clocked on the download button to instruct downloading.

In a case where determination is made in step 1003 that downloading has been instructed, in step 1004 the execution instructing apparatus downloads the read image by accessing the internal or external storage of the information processing server 3001 following the global image URL.

In step 1005, the execution instructing apparatus displays the read image that has been downloaded in step 1004, at the display unit 205.

On the other hand, in a case where determination is made in step 6010 in FIG. 6 described above, that the execution instructing apparatus can communicate with the image processing apparatus via the LAN without going through the information processing server 3001, the execution instructing apparatus executes the processing of step 1011 (see e.g., reference letter "B" in FIGS. 6 and 10).

In step 1011, the execution instructing apparatus uses the private URL generated in step 6008 to instruct the image processing apparatus to read the original via the LAN, without going through the information processing server 3001.

In step 1012, the execution instructing apparatus determines whether or not a private URL for accessing the read image has been received.

In a case where determination is made in step 1012 that the private URL has been received, in step 1013 the execution instructing apparatus obtains the read image via the LAN, without going through the information processing server 3001. The read image is then displayed in the above-described step 1005.

In step 1021, the image processing apparatus determines whether or not the execution instructing apparatus has instructed to read via the LAN in step 1011. In a case where determination is made that execution of reading has been instructed, the flow advances to step 1022.

In step 1022, the image processing apparatus extracts parameters added to the URL used for this access. Image reading settings are embedded in the parameters, so in step 1023 the image processing apparatus executes the image reading using these settings.

In step 1024, the image processing apparatus saves the read image, obtained by reading the original in step 1023, in internal storage such as the flash memory 112, or external storage on the LAN. The read image is saved according to the image format specified in the aforementioned parameters. The image processing apparatus then generates a private image URL so external devices within the LAN can access the read image. The generated private image URL is a URL such as http://192.168.0.10/ScanResult.jpg for example.

In step 1025, the image processing apparatus transmits the private image URL generated in step 1024 via the LAN as a response to the access from the execution instructing apparatus via the LAN, without going through the information processing server 3001.

The read image acquisition processing by the execution instructing apparatus in step 1013 described above is executed according to the private image URL in step 1025.

According to the processing described in FIGS. 6 and 10, in a case where the execution instructing apparatus is capable of communication with the image processing apparatus via the LAN, the execution instructing apparatus can give read instructions and acquire read images via the LAN, without going through an external network or information processing server 3001. On the other hand, in a case where the execution instructing apparatus is not capable of communication with the image processing apparatus via the LAN, the execution instructing apparatus can give read instructions and acquire read images via an external network such as the Internet, and information processing server 3001.

At the time of acquiring the read image such as described above, determination of whether to go through the information processing server 3001 or not is automatically made according to a response to the execution instructing apparatus having attempted access to the image processing apparatus using the private URL.

Further, in the example illustrated in FIG. 6, in a case where "NETWORK SCAN" is instructed in step 6000, the above-described determination is automatically performed in step 6010. Accordingly, even if the user does not select whether to acquire the read image via the LAN or via an external network, the execution instructing apparatus can automatically make this determination.

For example, an arrangement may be made where an icon or button for "NETWORK SCAN" is provided on the display screen displayed on the display unit 205 of the execution instructing apparatus, and the processing of FIG. 6 is executed which this icon or button is instructed. In this case, icons or buttons for each of a scan via LAN and a scan via external network do not have to be displayed, and the user does not have to select one.

Specifically, in a case where the LAN is constructed in the home of the user, a local scan can be performed. If a scan is performed via an external network nonetheless, communication has to be performed via the information processing server 3001 or the like and the external network to acquire the read image, so acquisition of the read image may be slower.

According to the present embodiment, a single user option of "NETWORK SCAN", for example, can be provided, regardless of external network or LAN, with priority given to a scan by LAN is available, as described above. Accordingly, a situation can be avoided where a scan by an external network is performed even though high-speed data transfer via LAN is available at the home of the user.

Also, in a case where both options of scan by LAN and scan by external network are provided to the user, an arrangement may be made where, even if the user instructs an external network, a scan by LAN is executed with higher priority if available. Accordingly, even if a scan by an external network is instructed by mistake though high-speed data transfer via LAN is available at the home of the user, the scan by LAN can be executed.

Further, in the present embodiment, the private URLs of image processing apparatuses which read images via the LAN are registered in the information processing server 3001 on an external network. In a case where a private URL of an image processing apparatus changes, the registration information in the information processing server 3001 also changes. Accordingly, the execution instructing apparatus does not have to keep holding the private URL, and can obtain the newest private URL of the image processing apparatus by accessing the information processing server 3001.

In a case where a private URL has thus been registered in the information processing server 3001, the execution instructing apparatus accesses the information processing server 3001 even if reading via the LAN. However, data of addresses such as a private LAN is often sufficiently smaller in data size as compared to image data such as read images. Accordingly, even though the information processing server 3001 is accessed for reading via the LAN, the read image can be acquired at high speed as compared to a method of image data communication via an external network.

Figure 12:
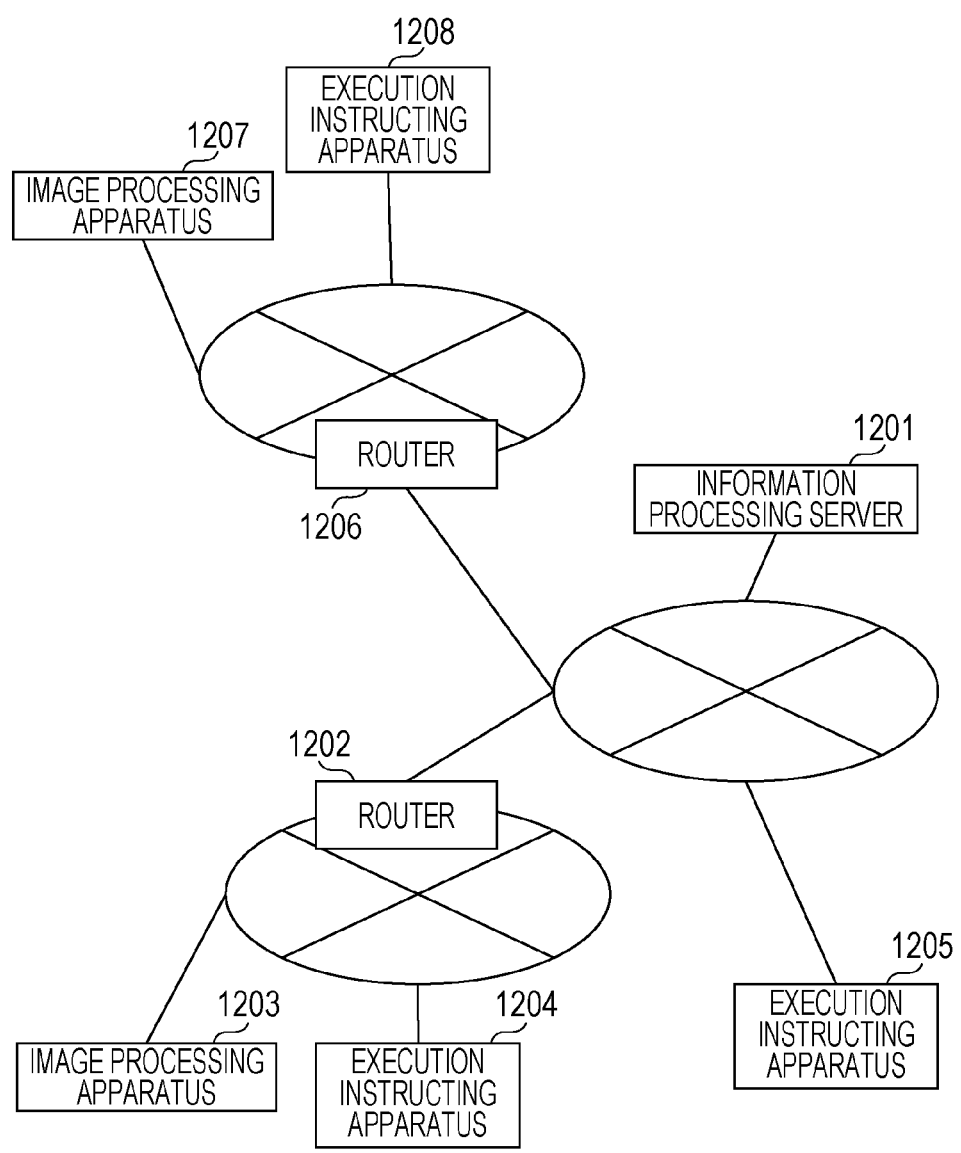
FIG. 12 is a diagram illustrating an example of a system including the image processing apparatus, execution instructing apparatus, and information processing server.

While an example has been described above in the present embodiment primarily regarding an example where an image processing apparatus is connected to an in-home LAN, there are cases where image processing apparatuses are installed in environments where multiple LANs have been constructed, such as in offices or business locations. FIG. 12 is a diagram illustrating an example of a system including image processing apparatuses, execution instructing apparatuses, and an information processing server. Configurations which are the same as those illustrated in FIG. 3 will be omitted from description.

An information processing server 1201 has the same configuration and functions as the information processing server 3001 described above. A router 1202 and a router 1206 have the same configuration and functions as the router 3002. Execution instructing apparatuses 1204, 1205, and 1208, and image processing apparatuses 1203 and 1207 illustrated in FIG. 12 also have the same configurations and functions as the execution instructing apparatus and image processing apparatus illustrated in the above description.

Multiple LANs are constructed in FIG. 12. execution instructing apparatuses and image processing apparatuses connected to the LANS are in a state of being capable of accessing servers on external networks via routers and ISPs which are omitted from illustration.

The image processing apparatus 1203 and the image processing apparatus 1207 connected to different LANs in FIG. 12 may be apparatuses of the same type, and the router 1202 and router 1206 may be of the same type. In an office environment for example, routes and image processing apparatuses of the same type may be installed in multiple business locations, in which case LANs at each of the multiple business locations are similar network configurations.

Each of the multiple LANs in such a network configuration may assign the same IP address to the image processing apparatuses. Note however, that a unique local IP address is assigned within each LAN. Accordingly, each image processing apparatus can be uniquely identified when identifying image processing apparatuses within one LAN. That is to say, even if the local IP of one image processing apparatus is the same as the local IP of another image processing apparatus connected to a different LAN, there is no concern of the image processing apparatuses being erroneously identified.

However, in the present embodiment such as described above, the information processing server registers private addresses based on local IP addresses for the image processing apparatuses connected to the multiple LANs. Accordingly, if the local IP addresses on the multiple LANs are the same, the private addresses corresponding to the multiple image processing apparatuses may be registered in duplicate.

For example, the same private URL may be registered in the information processing server 1201 for the image processing apparatus 1203 and the image processing apparatus 1207, and the execution instructing apparatus 1204 may select the image processing apparatus 1207. In this case, attempting to access using the private address of the image processing apparatus 1207 may result in the user unwittingly accessing the image processing apparatus 1203, since the execution instructing apparatus 1204 is within the same LAN as that to which the image processing apparatus 1203 is connected.

Accordingly, image processing apparatuses regarding which the execution instructing apparatuses instruct processing may be identified by ID information, which is identifying information to identify image processing apparatuses, in addition to private addresses.

Figure 13:
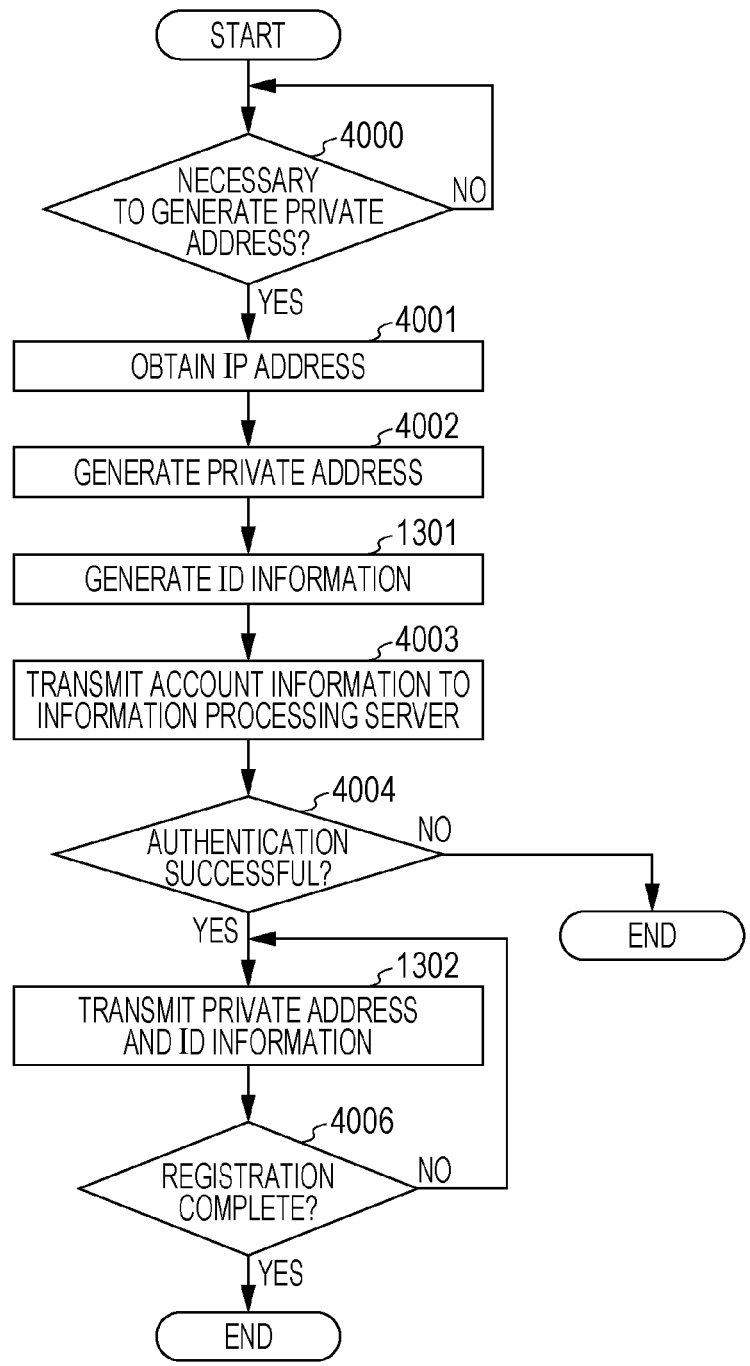
FIG. 13 is a flowchart illustrating processing of the image processing apparatus registering a private address and ID information in the information processing server.

FIG. 13 is a flowchart illustrating processing of image processing apparatuses registering private addresses and ID information at an information processing server. Processing the same as that in FIGS. 4A and 4B will be omitted from description.

Steps 4000 through 4002 are processing the same as in FIG. 4A.

In step 1301, image processing apparatuses generate unique IDs which are unique for each apparatus. Serial IDs or globally unique identifiers (GUIDs) are used, for example. An arrangement may also be made where friendly names, such as installation locations, nicknames, and so forth are registered for the image processing apparatuses by the user using the operating unit 109, to facilitate selection of one image processing apparatus out of many, and this information is used as the ID information.

The flow then advances through the processing insteps 4003 and 4004 which are the same as in FIG. 4A. In step 1302, the above ID information is transmitted to the information processing server 1201 along with the model name and private address of the image processing apparatus.

The information processing server 1201 performs processing the same as that illustrated in FIG. 4B. Note however, that in step 4015, the above ID information is saved in addition to the private URL received from the image processing apparatus.

Figure 14:
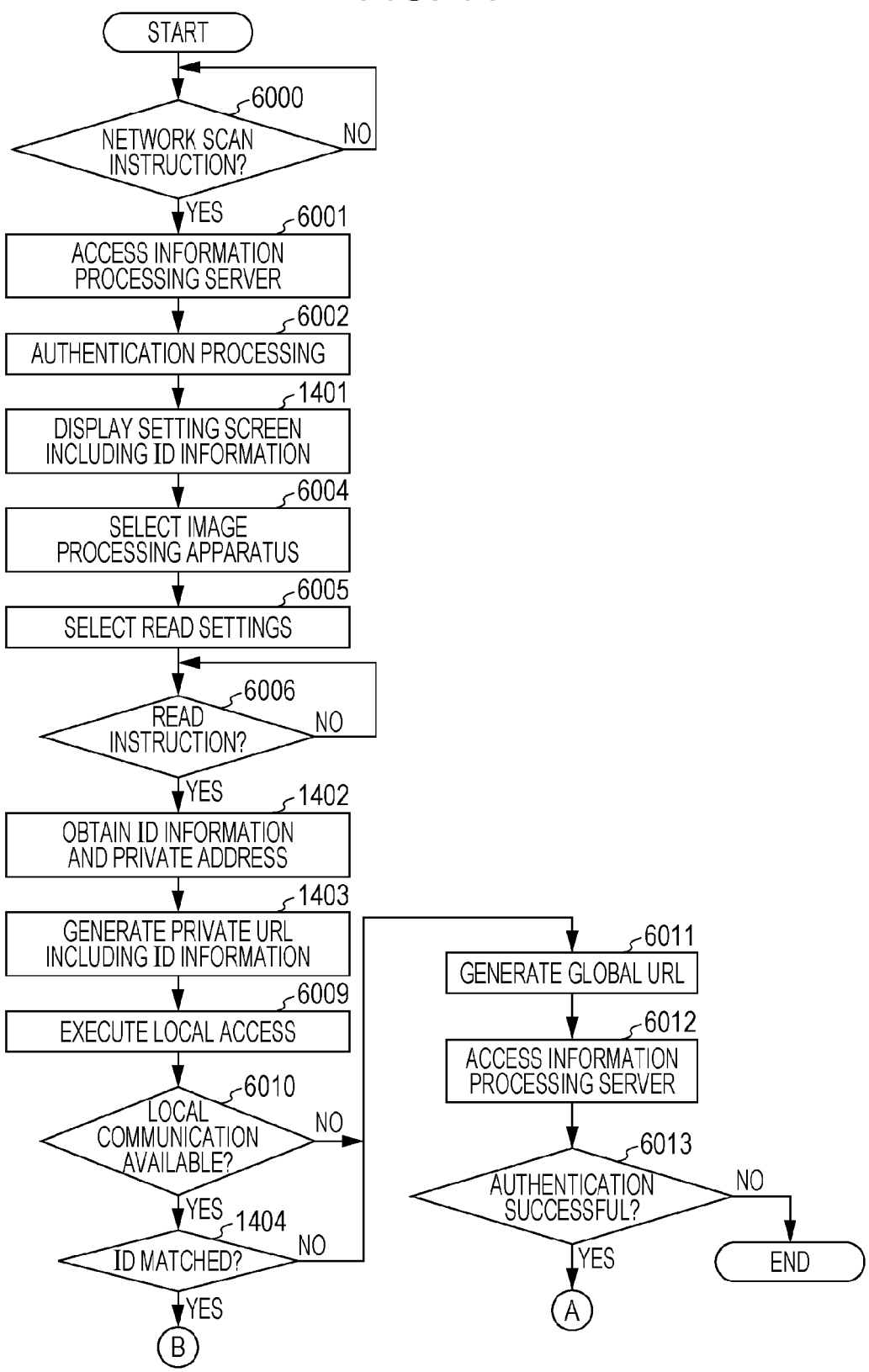
FIG. 14 is a flowchart illustrating an example of processing, performed by the image processing apparatus, to identify an image processing apparatus using ID information.

The execution instructing apparatus determines whether or not an image processing apparatus selected by the user is connected to this LAN, using the above ID information. FIG. 14 is a flowchart illustrating an example of processing, performed by an execution instructing apparatus, to identify an image processing apparatus using ID information. Detailed description of processing the same as that in the flowchart in FIG. 6 will be omitted here.

Steps 6000 through 6002 are processing the same as in FIG. 6.

In the processing in step 1401, the execution instructing apparatus displays a settings screen based on UI data provided from the information processing server 1201. The information processing server 1201 has included the above ID information in the transmitted UI data. Accordingly, the settings screen displayed in step 1401 includes this ID information.

FIG. 15 is an example of a settings screen including ID information of an image processing apparatus. Note that in the example illustrated in FIG. 15, the user has registered the installation location of the image processing apparatus in the image processing apparatus, and the information of the installation location is reflected in the settings screen, so the installation location of the apparatus is displayed alongside the product name of the image processing apparatus. Accordingly, the user can select the image processing apparatus by confirming the installation location in addition to the product name of the apparatus.

In a case where the user performs a read instruction in step 6006, in step 1402 the execution instructing apparatus obtains, from the information processing server 1201, the private address and ID information of the image processing apparatus selected by the user. In a case where the ID information has already been obtained, as indicated in the settings screen illustrated in FIG. 15, the ID information does not have to be obtained in step 1402.

In step 1403, the execution instructing apparatus generates a private URL including the private address and read settings as in the case of the private URL generated in the above-described step 6008, but further including the ID information obtained in step 1402.

Thereafter, in step 6009 the execution instructing apparatus uses the private URL generated in step 1403 to attempt a local access to the image processing apparatus via the LAN.

In step 6010, determination is made regarding whether or not local communication can be made with the image processing apparatus, based on the response of the image processing apparatus as to the local access performed in step 6009, as described in FIG. 6.

In a case where local communication can be performed, determination is made in step 1404 regarding whether or not the ID information of the image processing apparatus registered in the image processing apparatus itself, and the ID information included in the private URL used in the local access, match. Specifically, the image processing apparatus compares the ID information within the private URL with the ID information registered within itself, and transmits the comparison results to the execution instructing apparatus. Determination is made in step 1404 regarding whether the two sets of ID information match, based on the comparison results.

Note that the determination processing method in step 1404 is not restricted to that described above. For example, an arrangement may be made where the above comparison is performed at the image processing apparatus, after which the image processing apparatus transmits information indicating access permission to the execution instructing apparatus if the two match, and transmits information indicating no access permission if the two do not match.

Alternatively, an arrangement may be made where the execution instructing apparatus obtains the ID information registered in the image processing apparatus, and compares the obtained ID information and the ID information added to the private URL, so that the execution instructing apparatus itself determines whether or not the two match.

Note however, that an arrangement where the image processing apparatus compares the ID information enables determination processing to be performed without transmitting the ID information registered in the image processing apparatus to the execution instructing apparatus, as described above, which can prevent the ID information from being leaked to an indeterminate number of execution instructing apparatuses.

According to the processing illustrated in FIG. 14 as described above, an image processing apparatus is identified regarding which local communication can be performed with the execution instructing apparatus (Yes in step 6010) and has registered therein ID information matching the ID information of the image processing apparatus selected by the execution instructing apparatus (Yes in step 1404). Thus, as described above, in a case where the user has selected an image processing apparatus connected to a LAN different to the LAN to which the execution instructing apparatus is connected, a situation in which the user identifies an image processing apparatus different from the intended one can be prevented.

While an example of using ID information for determining whether or not to communicate with the image processing apparatus via LAN as been illustrated in FIG. 14, the ID information can be used in other processing as well. For example, in a case of executing reading by a method of communicating the image data via the information processing server 1201, determination may be made regarding whether the ID information of the image processing apparatus selected at the execution instructing apparatus and the ID information registered in the image processing apparatus match. The information processing server 1201 may then transmit a job to the image processing apparatus in a case where the two match. This enables a situation to be prevented where a job is transmitted to an image processing apparatus other than the intended image processing apparatus in an arrangement where two or more image processing apparatus have been assigned the same IP address, for example.

Thus, even if the same private address is set to different image processing apparatuses in multiple LANs, the image processing apparatus selected at the execution instructing apparatus is properly identified.

An example of reading an original has been described in the embodiment above as an example of predetermined processing which an image processing apparatus performs, but the present embodiment is not restricted to this. For example, the predetermined processing may be an image processing apparatus executing printing of an image. The following is a description of processing according to the present embodiment regarding printing of an image. Description will be omitted which would be repetitive of that above regarding the reading of images.

In the processing of FIG. 6 described above, a settings screen such as illustrated in FIGS. 11A and 15 for reading originals is displayed at the execution instructing apparatus, for the user to select an image processing apparatus to read an original, and to select read settings.

In a case of printing images, a screen such as illustrated in FIG. 16 for example, is displayed upon the user instructing network printing at the execution instructing apparatus. FIG.

16 is a diagram illustrating an example of a print settings screen displayed at the execution instructing apparatus. The user of the execution instructing apparatus selects a desired image processing apparatus to execute printing at the print settings screen illustrated in FIG. 16, and selects desired print settings. The user can change or select print settings such as print quality, printing paper size, printing media, and so forth, for example.

Upon the user selecting the image processing apparatus and print settings in this manner, the execution instructing apparatus attempts local access following the private URL in the same way as described in FIG. 6, thereby determining whether local communication can be performed with the image processing apparatus.

The private URL here includes information of the print settings which the user has selected. For example, a private URL such as http://192.168.0.10/Print?Quality=Normal&Media=Photo&Size=A4 is generated.

In a case where local communication can be performed with the image processing apparatus, the execution instructing apparatus transmits printing target data to the image processing apparatus via the LAN, without going through the information processing server. For example, image data is transmitted to the private URL of the image processing apparatus as binary data, using the HTTP POST request method. In this case, the image file can be transmitted over a local network, without going through an external network such as the Internet. Accordingly, the image file can be transferred at higher speeds as compared to a case of transmitting the image file through an external network.

The image processing apparatus then prints the image based on the printing target data, following the print settings added to the above-described private URL.

In the other hand, in a case where local communication cannot be performed with the image processing apparatus selected by the user, the execution instructing apparatus generates a global URL corresponding to the image processing apparatus selected by the user. This global URL includes print settings selected by the user, and an authentication key such as described above. For example, a global URL such as http://www.example.com/ABCDEFGHIJK/Print?Quality=Normal&Media=Photo&Size=A4&KEY=ABCDEF123456789 is generated.

The execution instructing apparatus then transmits the printing target data to the information processing server following this URL. The information processing server generates a print job following the printing target data and the print settings added to the URL. A notification of the print job is transmitted from the information processing server to the image processing apparatus. The image processing apparatus receives the print job from the information processing server, and prints an image based on the printing target data, following the print job.

Note that the print job may include actual printing target data, or may be an address such as a URL or the like indicating the storage location where the actual data is stored. In a case where the print job includes such an address, the execution instructing apparatus stores the actual printing target data at a predetermined storage location, such as in a server on the Internet, or the like, and notifies the information processing server of information corresponding to the storage location. The information processing server then generates a print job including an address corresponding to the storage location, and the print job is transmitted to the image processing apparatus.

As described above, the execution instructing apparatus determines whether local communication with the image processing apparatus via LAN can be performed, in a case of an execution instructing apparatus causing an image processing apparatus to executing printing of an image as well. In a case where local communication can be performed, the execution instructing apparatus can give a print instruction of the image and transmit printing target data via the LAN, without going through an external network or information processing server. On the other hand, in a case where the execution instructing apparatus cannot perform local communication with the image processing apparatus over the LAN, the execution instructing apparatus can give a print instruction of the image and transmit printing target data via an external network, such as the Internet, and information processing server.

Thus, in the present embodiment as described above, read images and printing target data are transferred over a LAN or through an information processing server on an external network when an execution instructing apparatus causes an image processing apparatus to read an original or print an image. In a case where data transfer by LAN can be performed (e.g., if the execution instructing apparatus can connect to the LAN), data transfer over LAN is given priority.

Now, in such processing, there are cases where state of progress of the processing, such as reading an original or printing an image, is transferred to the execution instructing apparatus. Error information, such as insufficient remaining ink amount or a paper jam during printing may also be notified to the execution instructing apparatus, for example.

However, even of the data transfer has been performed over the LAN as described above, the execution instructing apparatus may move to a position where it cannot connect to the LAN during the processing, particularly if the execution instructing apparatus is a mobile terminal such as a smartphone. In this case, such transfer of state of progress and error notification may not be able to be made over the LAN.

Conversely, in a case where determination has not been made that data transfer over the LAN can be performed (e.g., in a case where the execution instructing apparatus cannot connect to the LAN), the execution instructing apparatus may move to a position where it can connect to the LAN during this processing. In this case, such transfer of information regarding the state of progress and error notification may be obtained over the LAN.

Accordingly, the image processing apparatus according to the present embodiment stores status information such as progress information indicating the state of progress, errors, and so forth, in internal memory for transfer over the LAN, and also transmits this status information to the information processing server on the external network.

Figure 17:
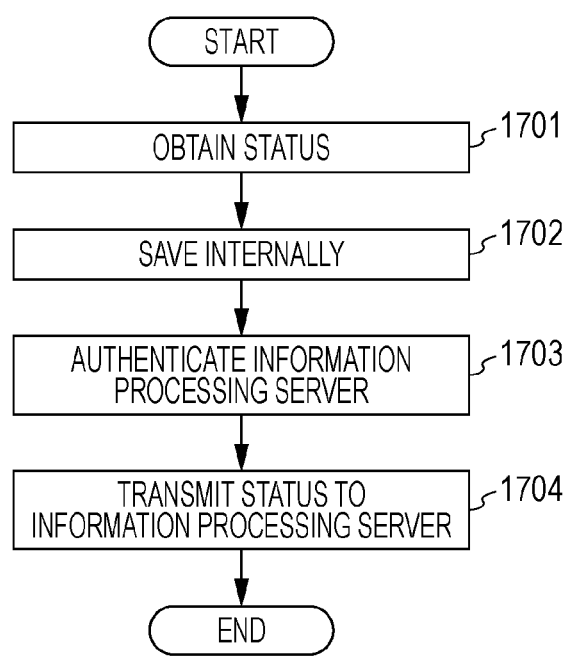
FIG. 17 is a flowchart for describing transmission processing of status information by the image processing apparatus.

FIG. 17 is a flowchart for describing transmission processing of status information by the image processing apparatus. Note that the status information according to the present embodiment in FIG. 17 includes progress information of processing such as reading, printing, and so forth, information necessary for printing such as remaining ink amount, absence-of-sheet error, and so forth.

In step 1701, the execution instructing apparatus obtains status information of the image processing apparatus. For example, the CPU 105 of the image processing apparatus can obtain remaining amount information indicating the remaining ink amount, using internal memory in which is written statuses from an unshown remaining ink amount sensor and statuses occurring during printing. The CPU 105 of the image processing apparatus can also obtain progress information indicating the state of progress by confirming progress when controlling the printer unit 101 and scanner unit 102.

In step 1702, the image processing apparatus saves the status information obtained in step 1701 in internal memory such as the flash memory 112 or the like. This saved status information is handed to the execution instructing apparatus when accessed by the execution instructing apparatus using the private URL.

In step 1703, the image processing apparatus 3003 accesses the information processing server and transmits the account name and password for authentication.

Upon authentication being performed at step 1703, in step 1704 the image processing apparatus transmits the status information obtained in step 1702 to the information processing server.

Note that the information processing server saves this status information in a storage region prepared for each account, in response to transmission of the status information by the image processing apparatus in step 1704. This saved status information is obtained by the execution instructing apparatus by the execution instructing apparatus accessing the information processing server.

Figure 18:
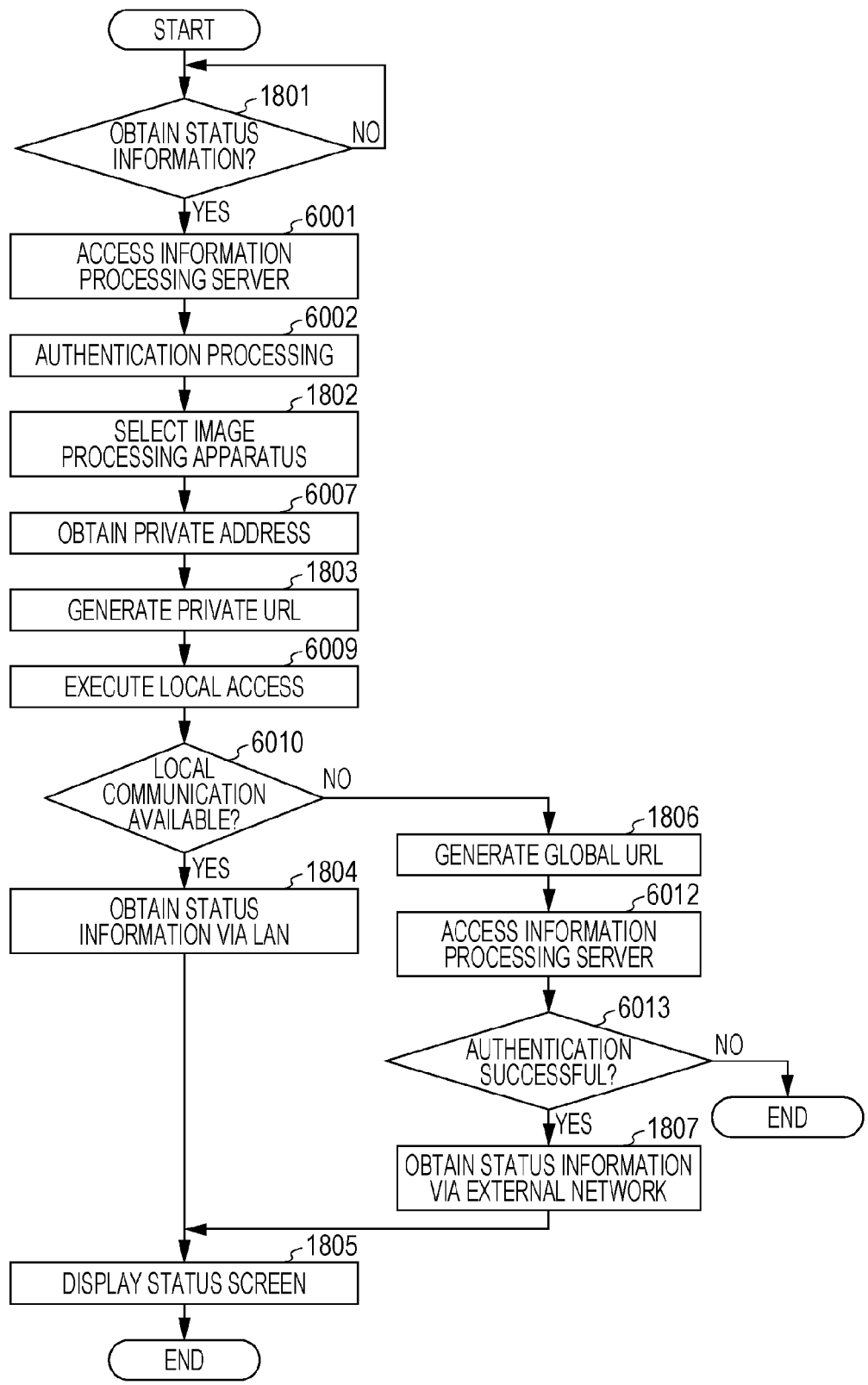
FIG. 18 is a flowchart illustrating processing of obtaining status information by the execution instructing apparatus.

Next, processing of the execution instructing apparatus obtaining status information will be described. FIG. 18 is a flowchart illustrating status information obtaining processing by the execution instructing apparatus. Note that in FIG. 18, the image processing apparatus has already been instructed to read an original or print an image, and the image processing apparatus is already executing this processing.

In step 1801 the execution instructing apparatus determines whether or not to obtain status information. This determination may be performed under the condition that the user has input a status obtaining instruction, or in a case where status information is to be obtained at predetermined time intervals, determination may be made regarding whether or not it is the timing to obtain status information in step 1801.

In steps 6001 and 6002, the information processing server is accessed and authentication is performed. This is the same as illustrated in FIG. 6.

In step 1802, the image processing apparatus regarding which status information is to be obtained is selected according to user instructions. Accordingly, in a case where processing is being executed at multiple apparatuses at the same time, for example, the status information of just the image processing apparatus which the user has selected can be obtained. In a case where processing is being executed at just one multiple apparatus, the processing of step 1802 may be omitted.

In step 6007, the private address of the image processing apparatus is obtained from the information processing server. In a case where the execution instructing apparatus causes the image processing apparatus to perform processing, and an execution instruction has been given by the processing illustrated in FIG. 6, authentication of the information processing server has been completed, and the private address of the image processing apparatus has already been obtained. Accordingly, this case, the processing of steps 6001, 6002, and 6007 may be omitted in this case.

In step 1803, the execution instructing apparatus generates a private URL necessary to obtain the status, from the private address obtained in step 6007. For example, a URL such as http://192.168.0.10/GetStatus.xml is generated.

In steps 6009 and 6010, determination is made regarding whether or not local communication can be made with the image processing apparatus following the above private URL.

In a case where determination is made that local communication can be performed, in step 1804 the execution instructing apparatus obtains the status information saved in the internal memory of the image processing apparatus in step 1702 described above via the LAN.

In step 1805, the execution instructing apparatus displays a status screen, indicating the status information obtained in step 1804, on the display unit 205.

Figure 19:
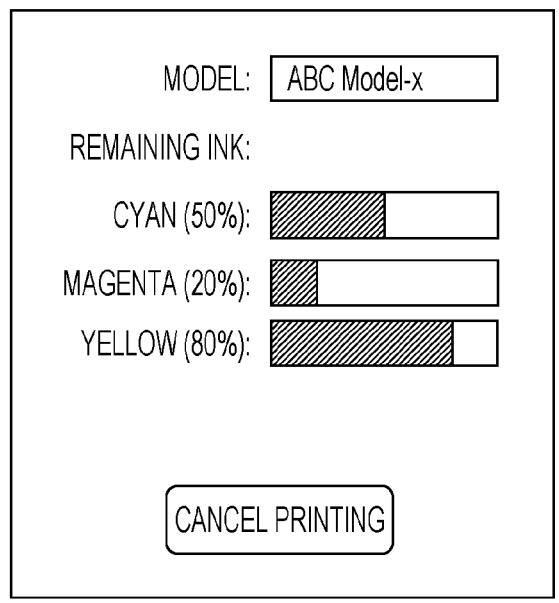
FIG. 19 is a diagram illustrating an example of a status screen.

FIG. 19 is a diagram illustrating an example of a status screen. In the example in FIG. 19, the image processing apparatus is executing printing of an image, the remaining ink amount of the image processing apparatus is obtained as status information, and the remaining ink amount is displayed in the status screen.

On the other hand, in a case where determination is made in step 6010 that local communication cannot be made, in step 1806 a global URL is generated to obtain status information. A URL with an authentication key attached, for example, such as http://www.example.com/ABCDEFGHIJK/GetStatus.xml?&KEY=ABCDEF123456789 is generated.

In steps 6012 and 6013, the information processing server is accessed following the above URL, and in step 1807 the status information of the image processing apparatus is obtained from the information processing server. Note that this status information is information which has been transmitted from the image processing apparatus to the information processing server in step 1704.

In step 1805, a status screen such as that illustrated in FIG. 19 is displayed.

An example where the execution instructing apparatus obtains the status of the image processing apparatus is illustrated in the example in FIG. 18, but the processing in FIG. 18 can also be applied in a converse case where the image processing apparatus obtains the status of the execution instructing apparatus. The processing in FIG. 18 can also be applied in a case of the user of the execution instructing apparatus causing the image processing apparatus to cancel reading and printing which had been instructed by the execution instructing apparatus, while the execution instructing apparatus is causing the image processing apparatus to execute reading or printing.

Figure 20:
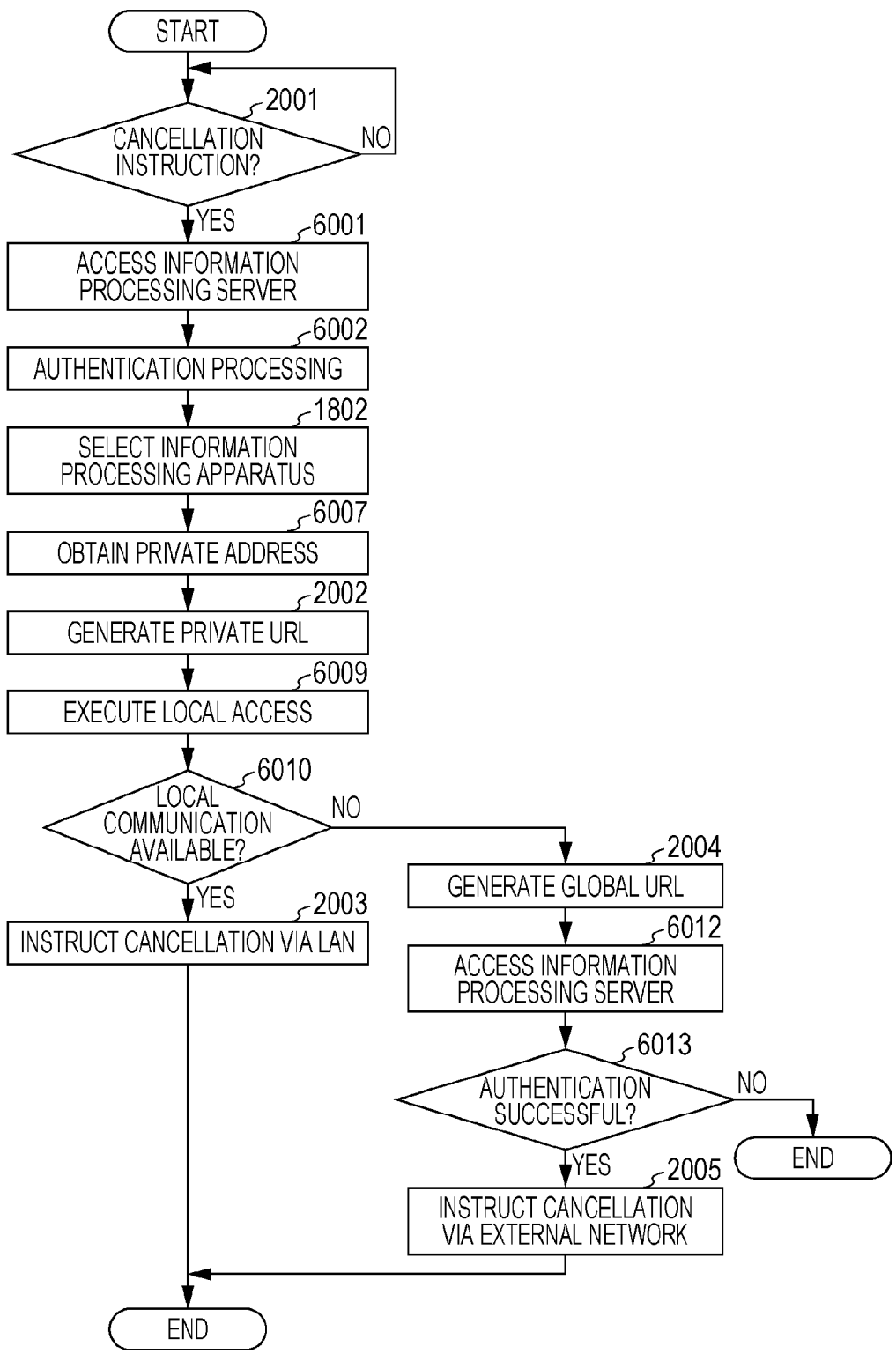
FIG. 20 is a flowchart illustrating cancellation processing by the execution instructing apparatus.

FIG. 20 is a flowchart illustrating cancelling processing by the execution instructing apparatus. Description of processing the same as that in FIG. 18 will be omitted.

In step 2001, determination is made regarding whether or not a cancellation instruction has been made by the user. For example, determination is made whether a cancel button such as the "CANCEL PRINTING" button on the status screen illustrated in FIG. 19 has been instructed. Note that an operation for cancellation instruction is not restricted to an instruction at the status screen, and may be an instruction as to a different screen. A cancellation instruction may be accepted in a case where a predetermined key on the execution instructing apparatus is pressed, or a predetermined operation is performed.

The processing in steps 6001, 6002, 1802, and 6007 is the same as that in FIG. 18, so description thereof will be omitted.

In step 2002, the execution instructing apparatus generates a URL necessary to transmit the status from the private address obtained in step 6007. For example, a URL such as http://192.168.0.10/SetStatus.html?Action=Cancel is generated.

In a case where determination is made in step 6010 that local communication can be performed with the image processing apparatus, in step 2003 the execution instructing apparatus instructs cancellation of the reading or printing which is being executed at the image processing apparatus, to the image processing apparatus via the LAN.

On the other hand, in a case where determination is not made in step 6010 that local communication can be performed, in step 2004 a global URL for instructing cancellation is generated. A URL with an authentication key attached, for example, such as http://www.example.com/ABCDEFGHIJK/SetStatus.html?Action=Cancel&KEY=ABCDEF123456789 is generated.

Upon the global URL being generated in step 2004, the execution instructing apparatus accesses the information processing server following this URL, and authentication is performed in step 6013.

Upon authentication being performed in step 6013, in step 2005 the execution instructing apparatus gives a cancellation instruction to the information processing server via the external network. The information processing server which has received this cancellation instruction instructs the image processing apparatus to cancel the reading or printing.

Upon cancellation being instructed in step 2003 or 2005, the image processing apparatus cancels the reading or printing being executed.

While an example of giving a cancellation instruction regarding processing being executed has been described in FIG. 20, various types of instructions to change operations of the image processing apparatus may be given, such as an instruction to resume reading or printing, or an instruction to change settings regarding the processing being executed, for example.

Thus, according to the processing in FIGS. 18 and 20, even in a case where the execution instructing apparatus has instructing reading of an original or printing via the LAN, for example, determination is made regarding whether or not local communication can be made with the image processing apparatus when obtaining status information or instructing cancellation. In a case where local communication is not available, the obtaining of status information or instructing of cancellation is performed via the information processing server. Accordingly, obtaining status information or instructing cancellation can be performed even if the user has instructed execution of processing via the LAN but then has moved to a location away from the LAN (e.g., away from home).

Conversely, obtaining status information or instructing cancellation via the LAN can be performed even if the user has instructed execution of processing via the information processing server but then moved to a location where the LAN is accessible. Accordingly, obtaining of status information and instructing cancellation can be performed faster than a case of going through the external information processing server.

Whether to perform such obtaining of status information and instructing cancellation via the LAN or via the information processing server does not have to be decided by the user, as this is automatically determined. Accordingly, the user does not have to determine whether the LAN is accessible at the current location and then select from the two methods, for example, since a suitable method is automatically selected. Moreover, obtaining of status information and instructing cancellation via the LAN is given priority in the selection, so this processing can be performed at higher speed.

While description has been made regarding the above embodiment by way of an example where private addresses are generated for the image processing apparatuses, the present invention is not restricted thusly. For example, Internet Printing Protocol (hereinafter "IPP") or Web Services on Devices (hereinafter "WSD") endpoints or local ports may be generated so as to be accessible from execution instructing apparatuses, yielding the same advantages. In this case, the same processing as with the above-described embodiment can be realized by accessing the generated IPP or WSD endpoints or local ports, where the URL is accessed in step 6008 in FIG. 6. In any case, execution instructing apparatuses can access from Web browsers, and the technology is configured using commonplace HTTP technology, so the user can use the technology without preparing or installing dedicated applications for execution instructing apparatuses.

While description has been made regarding the above embodiment by way of an example where an execution instructing apparatus causes an image processing apparatus to read an original or print an image, the present invention is not restricted thusly. For example, the processing may be storing various types of data, including images and the like, in a processing apparatus, or causing the processing apparatus to transfer the data to another apparatus. Thus, the present embodiment is applicable to various types of processing, and in not restricted to printers and scanners but is applicable to various types of devices including monitors of television receivers and the like, storage devices, PCs, and so forth.

Various apparatuses may be used as execution instructing apparatuses, such as PCs, smartphones, cellular phones, tablets, and so forth.

While description has been made regarding the above embodiment by way of an example where execution instructing apparatuses and image processing apparatuses perform local communication via a LAN, the present invention is not restricted thusly. For example, cabled communication may be performed between execution instructing apparatuses and image processing apparatuses through various types of cable interfaces such as a USB interface, or wireless communication such as Bluetooth or Near Field Communication (NFC) or the like may be performed.

The information processing server in the above-described embodiment may be configured including a single server, or multiple servers may collaboratively operate to serve as the information processing server according to the above embodiment.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The program code for realizing the functions of the present embodiment may be executed by a single computer (CPU or micro processing unit (MPU)), or may be executed by multiple computers operating collaboratively. Further, a computer may execute the program code, or hardware such as a circuit for realizing the functions of the program code may be provided. Further, an arrangement may be made where part of the program code is realized by hardware and the remaining part is executed by computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-262769, filed Dec. 19, 2013, which is hereby incorporated by reference herein in its entirety.

What is claimed is:

1. An instructing apparatus which is communicable with at least one processing apparatus that executes a predetermined processing, the instructing apparatus comprising:
    an obtaining unit configured to obtain, via the Internet from a server system which is neither an image processing apparatus nor the instructing apparatus, information for performing communication with the image processing apparatus via a local area network and without the Internet, wherein the information is stored in the server system by the image processing apparatus;
    a determination unit configured to determine whether, of
        a first instruction method where the instructing apparatus issues an instruction regarding the predetermined processing to the image processing apparatus via the Internet and the server system, and
        a second instruction method where the instructing apparatus issues the instruction to the image processing apparatus via the local area network and without the Internet,
    the instruction can be performed in accordance with the second instruction method, based on the information obtained by the obtaining unit; and
    an instruction unit configured to issue the instruction to the image processing apparatus so that
        in a case where a determination is not made by the determination unit that the instruction can be performed in accordance with the second instruction method the instruction is performed in accordance with the first instruction method, and
        in a case where a determination is made by the determination unit that the instruction can be performed in accordance with the second instruction method, the instruction is performed in accordance with the second instruction method.

2. The instructing apparatus according to claim 1,
wherein the server system stores the information, the at least one processing apparatus including a plurality of processing apparatuses and the information corresponding to each of the plurality of processing apparatuses,
and wherein the obtaining unit obtains the information by requesting the server system for information corresponding to at least one processing apparatus, of the plurality of processing apparatuses, that executes the predetermined processing.

3. The instructing apparatus according to claim 2,
wherein the obtaining unit requests the server system for the information corresponding to the at least one processing apparatus that executes the predetermined processing by notifying the server system of the at least one processing apparatus that executes the predetermined processing.

4. The instructing apparatus according to claim 1,
wherein the obtaining unit obtains the information, and identifying information that identifies the at least one processing apparatus corresponding to the information, from the server system,
and wherein, in a case where
    a determination is made by the determination unit that the instruction can be performed with the at least one processing apparatus in accordance with the second instruction method, and
    the identifying information obtained by the obtaining unit corresponds to identifying information which the at least one processing apparatus that executes the predetermined processing has,
the instruction unit issues the instruction in accordance with the second instruction method.

5. The instructing apparatus according to claim 1,
wherein the instruction unit issues an instruction to obtain data obtained by the at least one processing apparatus performing the predetermined processing, as the instruction regarding the predetermined processing.

6. The instructing apparatus according to claim 5,
wherein the at least one processing apparatus is an apparatus which executes reading control processing to cause a reading apparatus to read an original, as the predetermined processing,
and wherein data obtained by the predetermined processing is a read image read by the reading control processing.

7. The instructing apparatus according to claim 5,
wherein the instruction unit issues an instruction to receive information to obtain data obtained by the predetermined processing, as the instruction to obtain data, and further receives the data using the information.

8. The instructing apparatus according to claim 1,
wherein the instruction unit executes transmission of data to be subjected to the predetermined processing by the at least one processing apparatus, to the at least one processing apparatus, as the instruction regarding the predetermined processing.

9. The instructing apparatus according to claim 8,
wherein the at least one processing apparatus is an apparatus which executes printing control processing to print printing target data on a printing medium, as the predetermined processing,
and wherein the instruction unit transmits printing target data to be subjected to the printing control processing.

10. The instructing apparatus according to claim 1,
wherein the instruction unit issues an instruction to instruct the at least one processing apparatus to execute the predetermined processing, as the instruction regarding the predetermined processing.

11. The instructing apparatus according to claim 1,
wherein the instruction unit issues an instruction for reception of status information of the at least one processing apparatus, based on the predetermined processing by the at least one processing apparatus, as the instruction regarding the predetermined processing.

12. The instructing apparatus according to claim 1,
wherein the instruction unit issues an instruction to instruct the at least one processing apparatus to cancel the predetermined processing by the at least one processing apparatus, as the instruction regarding the predetermined processing.

13. The instructing apparatus according to claim 1,
wherein, in a case where the determination unit has determined that instruction can be performed in accordance with the second instruction method, the instruction unit issues the instruction in accordance with the second instruction method, even if an instruction by a user instructing is an instruction to execute the predetermined processing using instruction in accordance with the first instruction method.

14. The instructing apparatus according to claim 13, wherein all of the obtaining by the obtaining unit, the determination by the determination unit, and the instruction by the instruction unit, are executed in response to the instruction by the user.

15. The instructing apparatus according to claim 1, wherein the obtaining unit obtains a local IP address of the image processing apparatus as the information.

16. The instructing apparatus according to claim 1, wherein at least one of: (i) the instructing apparatus is any one of at least a personal computer, cellular phone, and smartphone; and (ii) the at least one processing apparatus is at least one of the image processing apparatus, the server system and an information processing server.

17. The instructing apparatus according to claim 1, wherein the determination unit executes a processing for communication with the image processing apparatus via the local area network and without the Internet, and
the determination unit determines whether or not the instruction can be performed in accordance with the second instruction method, in a case where a response is received from the image processing apparatus in response to the executed processing.

18. The instructing apparatus according to claim 1, wherein the instruction unit is configured to issue the instruction to the image processing apparatus in accordance with the second instruction method by using the information which has been obtained by the obtaining unit.

19. A method executed by an instructing apparatus which is communicable with at least one processing apparatus that executes a predetermined processing, the method comprising:

obtaining, via the Internet from a server system which is neither an image processing apparatus nor the instructing apparatus, information for performing communication with the image processing apparatus via a local area network and without the Internet, wherein the information is stored in the server system by the image processing apparatus;

determining whether, of
a first instruction method where the instructing apparatus issues an instruction regarding the predetermined processing to the image processing apparatus via the Internet and the server system, and
a second instruction method where the instructing apparatus issues the instruction to the image processing apparatus via the local area network and without the Internet,
the instruction can be performed in accordance with the second instruction method, based on the obtained information; and issuing the instruction to the image processing apparatus so that
in a case where a determination is not made that the instruction can be performed in accordance with the second instruction method, the instruction is performed in accordance with the first instruction method, and
in a case where a determination is made that the instruction can be performed in accordance with the second instruction method, the instruction is performed in accordance with the second instruction method.

20. A non-transitory storage medium storing a program causing a computer to execute the method according to claim 19.

* * * * *